June 14, 1955
G. GORHAM
2,710,715
AUTOMATIC FRACTION COLLECTION APPARATUS
Filed April 17, 1950
10 Sheets-Sheet 1
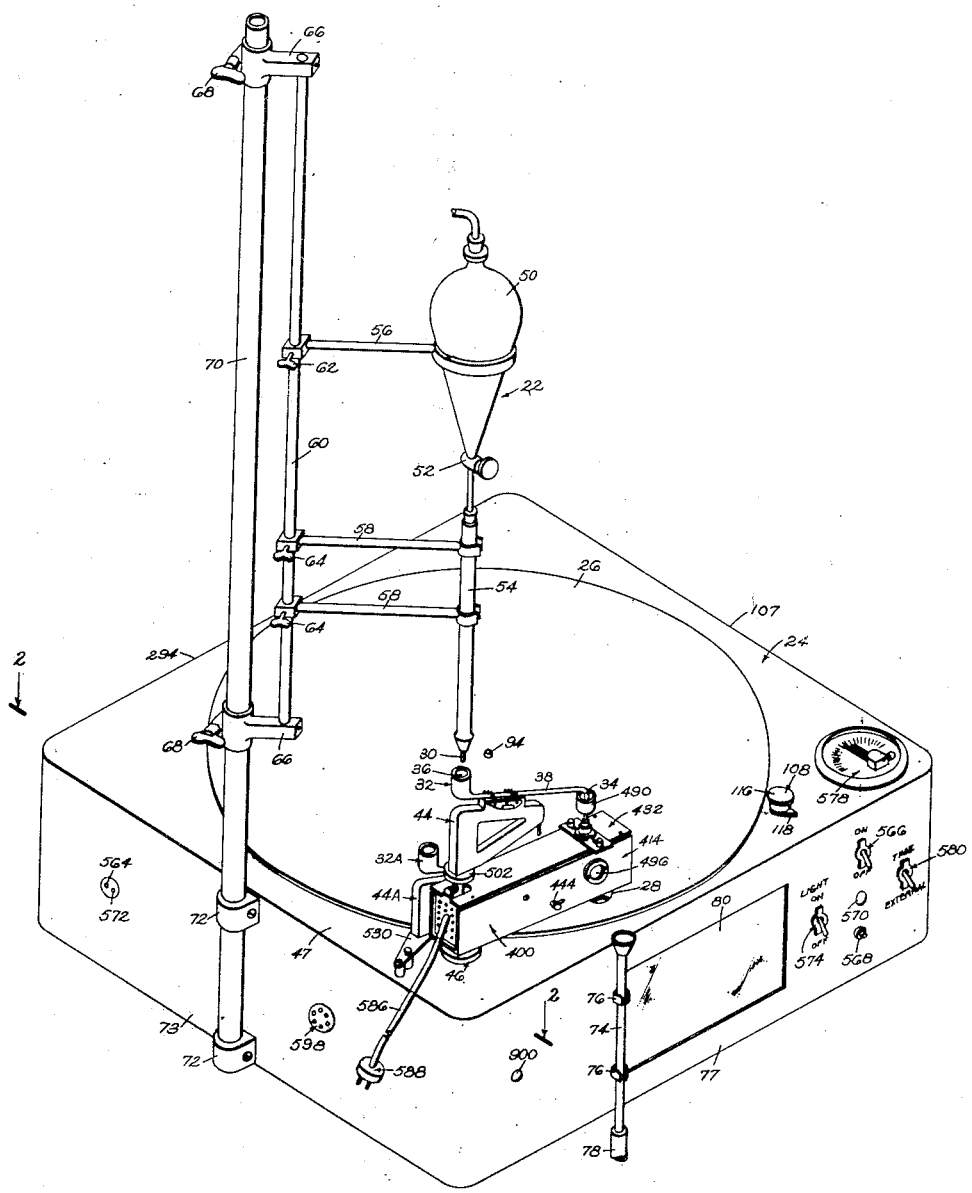
*INVENTOR.*
*GEORGE GORHAM*
BY Edwin Levisohn &
Harry Cole
ATTORNEYS June 14, 1955  G. GORHAM  2,710,715
AUTOMATIC FRACTION COLLECTION APPARATUS
Filed April 17, 1950  10 Sheets-Sheet 2
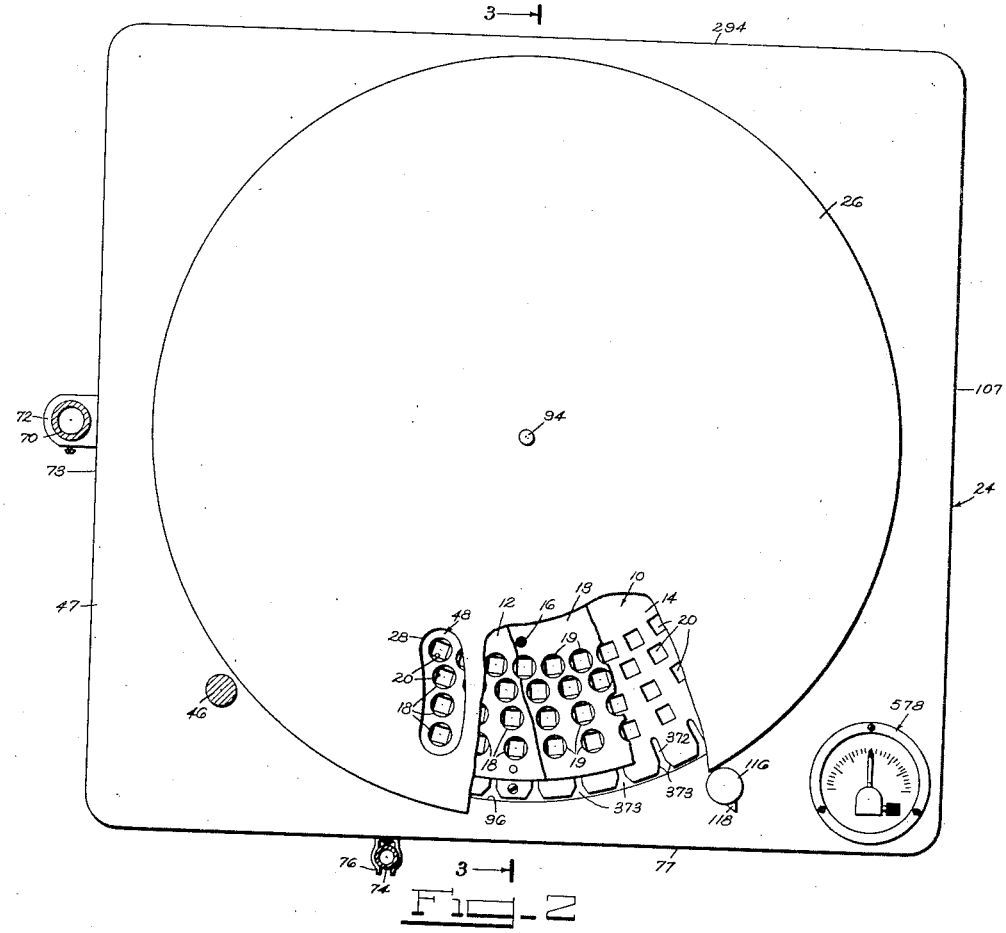
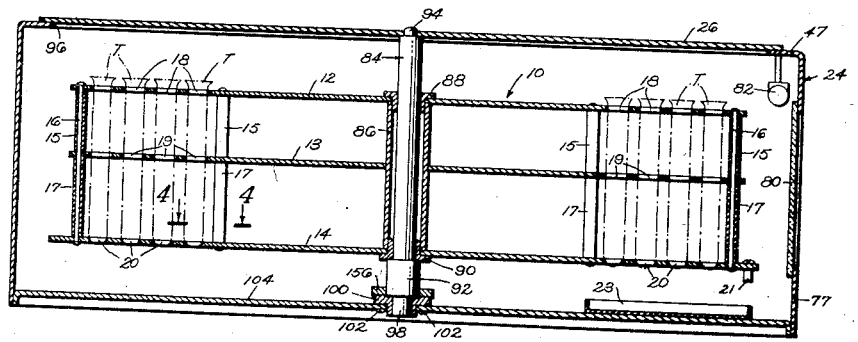
INVENTOR.
GEORGE GORHAM
BY
ATTORNEYS

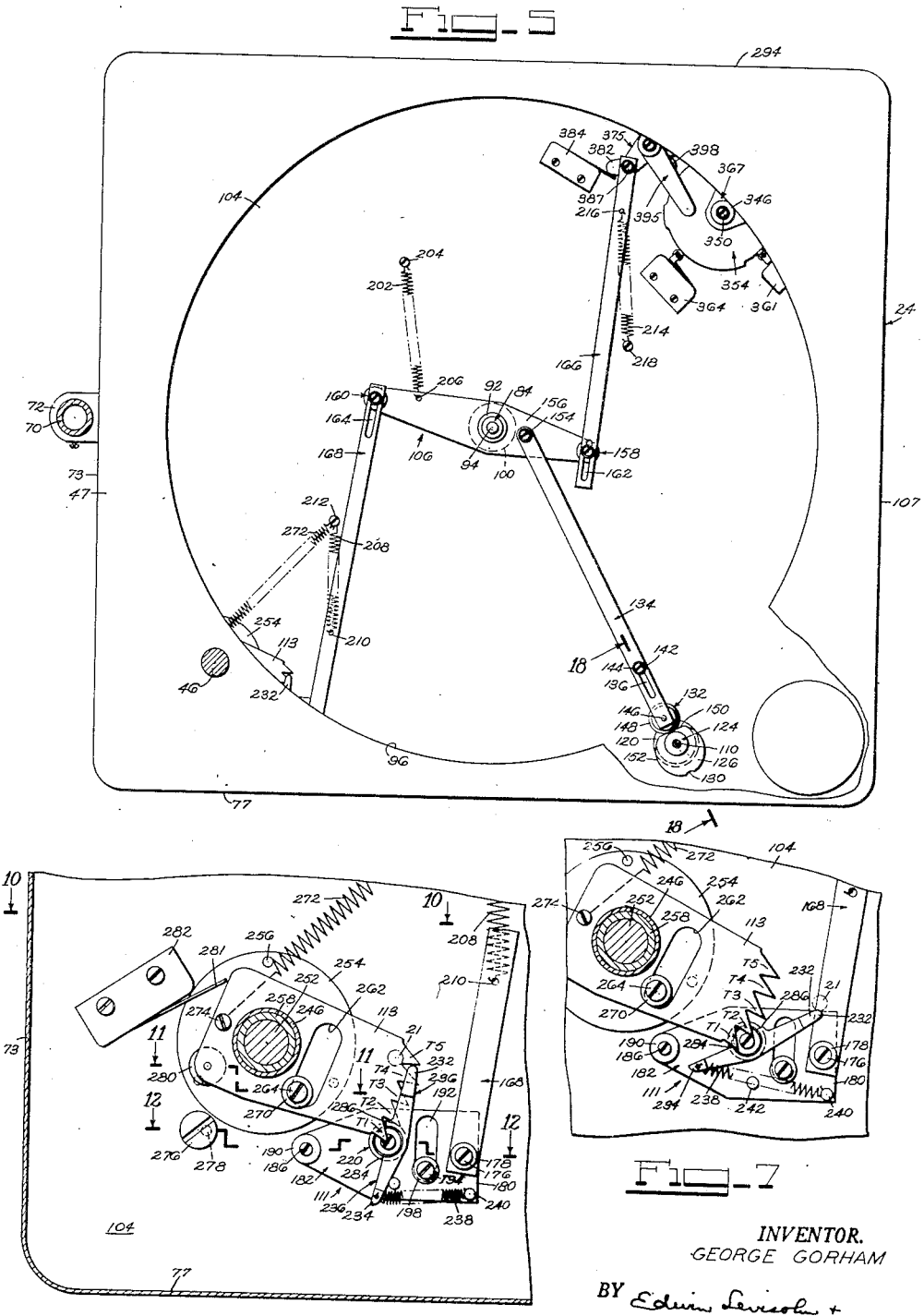

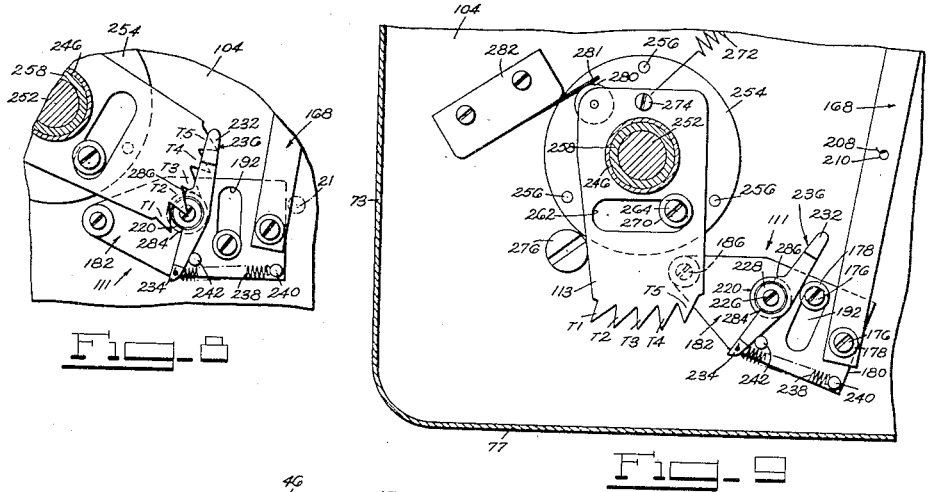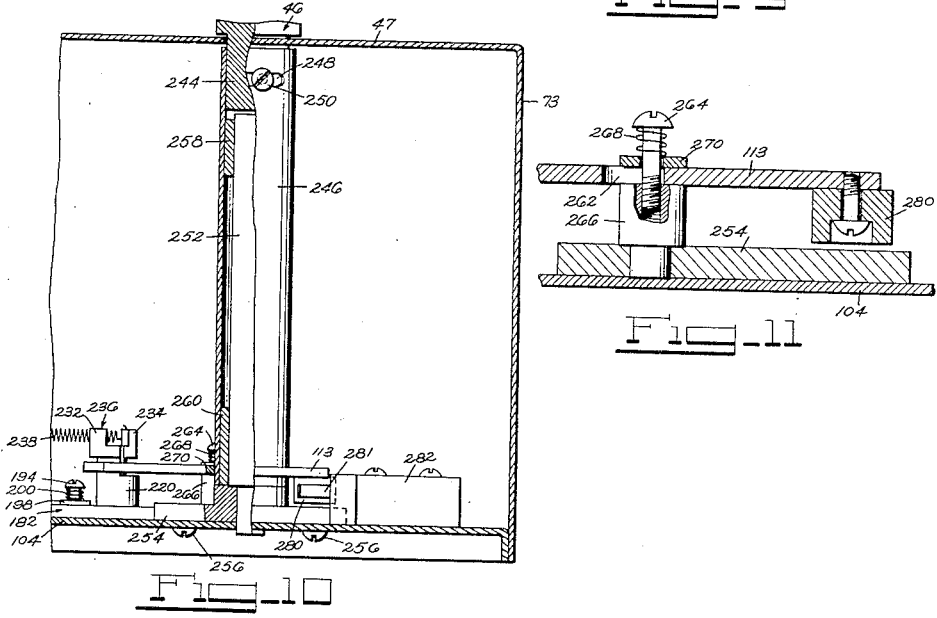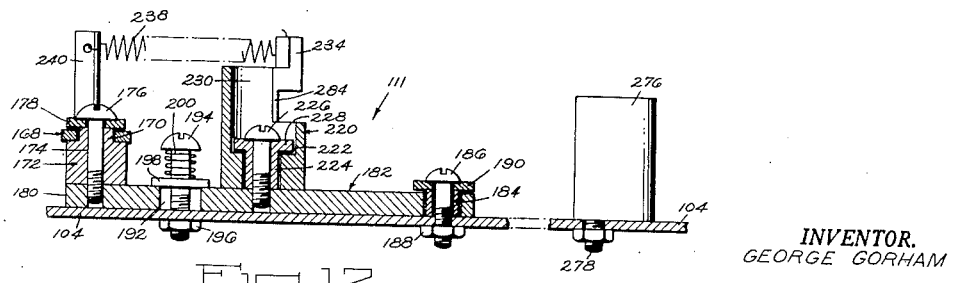

June 14, 1955

G. GORHAM 2,710,715

AUTOMATIC FRACTION COLLECTION APPARATUS

Filed April 17, 1950

INVENTOR.
GEORGE GORHAM

BY Edwin Levisoh &
Harry Cole

ATTORNEYS

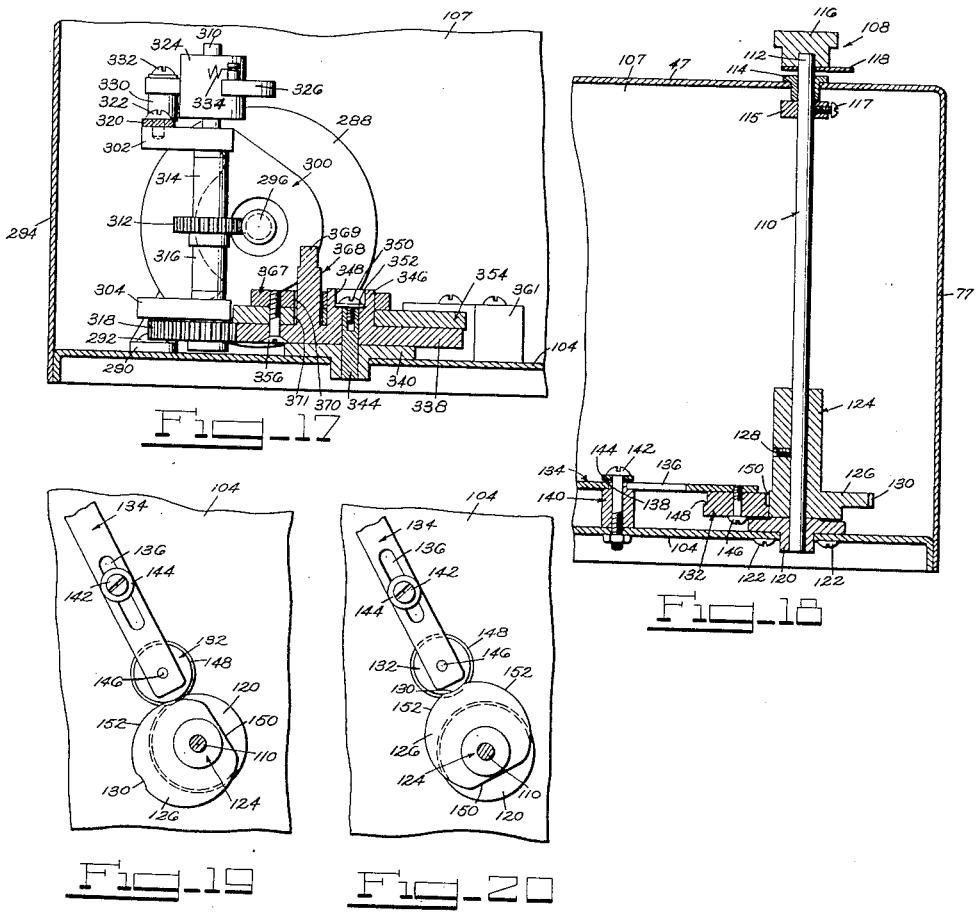

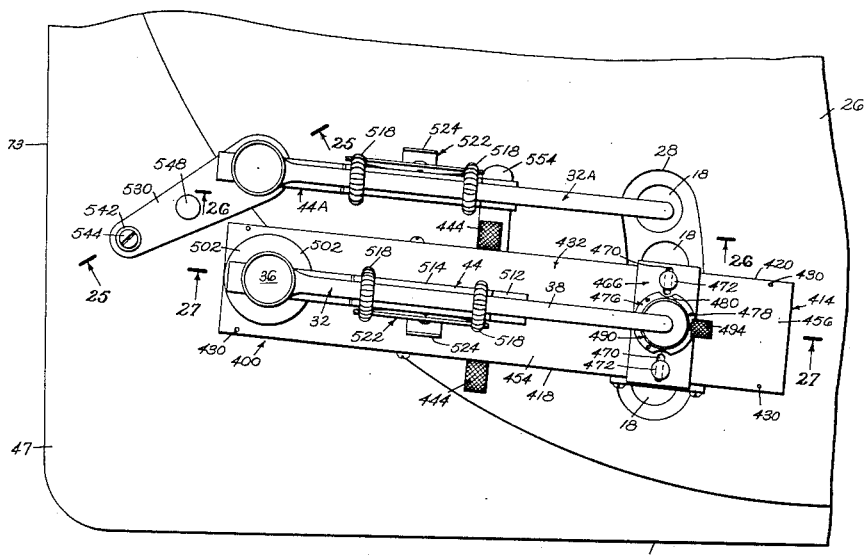

June 14, 1955        G. GORHAM        2,710,715
AUTOMATIC FRACTION COLLECTION APPARATUS
Filed April 17, 1950        10 Sheets-Sheet 8
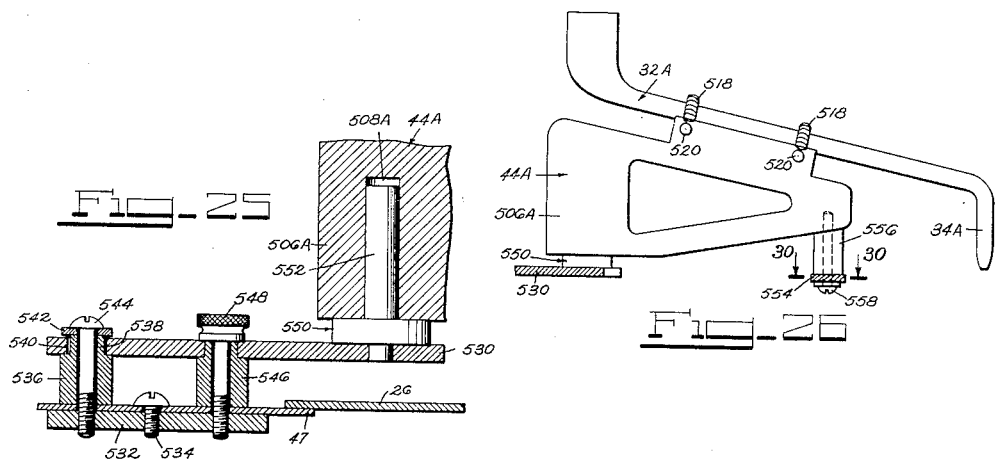
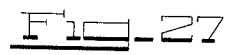
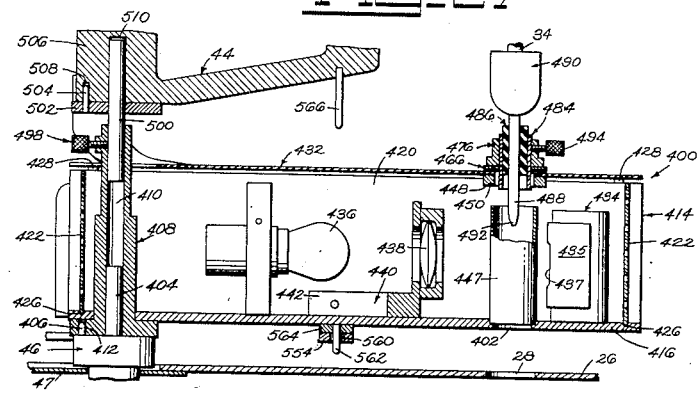
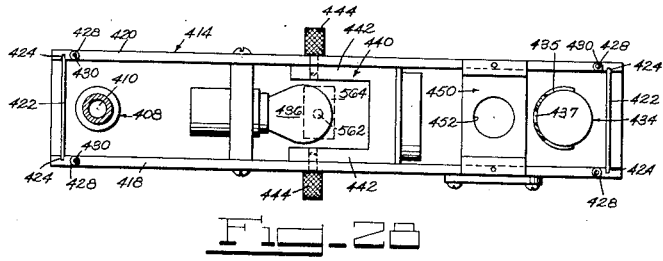
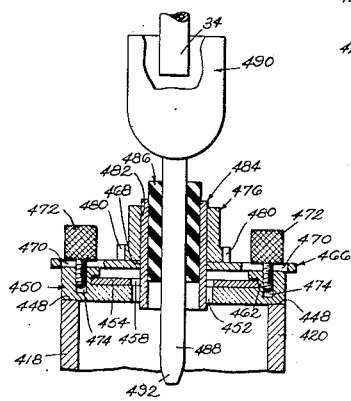
INVENTOR.
GEORGE GORHAM
BY Edwin Levison +
Harry Cole
ATTORNEYS June 14, 1955
G. GORHAM
2,710,715
AUTOMATIC FRACTION COLLECTION APPARATUS
Filed April 17, 1950
10 Sheets-Sheet 10
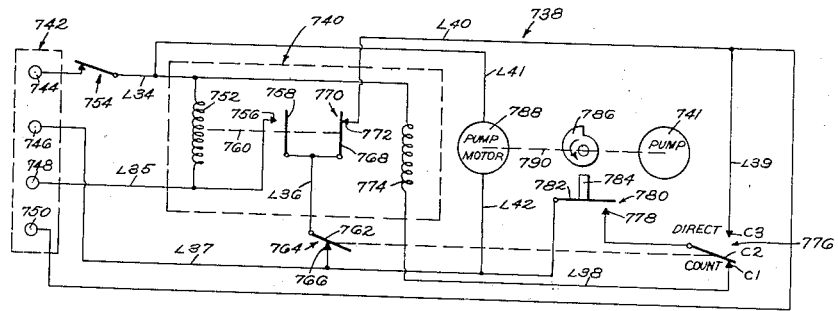
Fig-33
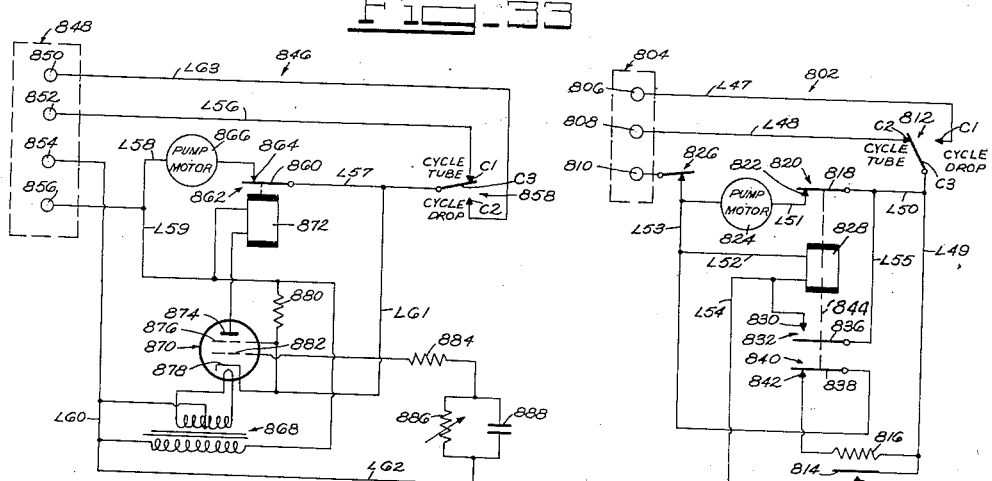
Fig-35
Fig-34
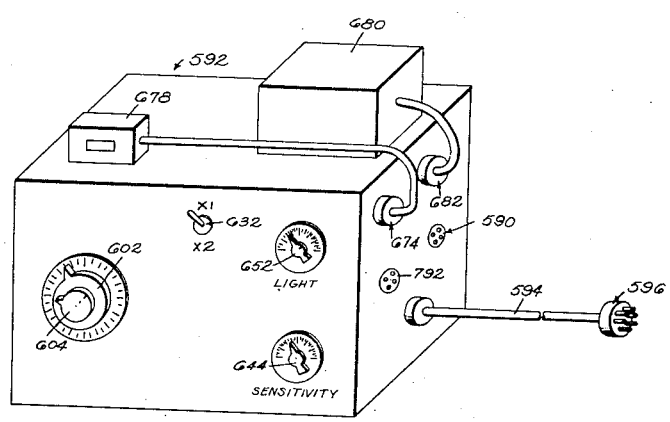
Fig-36
INVENTOR.
GEORGE GORHAM
BY Edwin Lincoln +
Harry Cole
ATTORNEYS

United States Patent Office 2,710,715
Patented June 14, 1955

2,710,715

AUTOMATIC FRACTION COLLECTION APPARATUS

George Gorham, New York, N. Y., assignor to Technicon Chromatography Corporation, New York, N. Y., a corporation Application April 17, 1950, Serial No. 156,282

53 Claims. (Cl. 226—97)

This invention relates to an automatic fraction-collection apparatus.

In my prior applications Serial No. 772,389, now Patent No. 2,604,249, filed September 5, 1947, Serial No. 12,130, now abandoned, filed February 28, 1948, and Serial No. 105,986, now Patent No. 2,604,248, filed July 21, 1949, there is disclosed and claimed fraction-collection apparatus of the general type with which the present invention is concerned. This application is a continuation-in-part of my application Serial No. 772,389.

One object of the present invention is the provision of fraction-collection apparatus which may be provided with both time-responsive means and drop counter means, or with either of them, for accurately determining and measuring the quantity of substance to be supplied to each of the receptacles, the one or the other of said means being available for different uses and purposes of the apparatus.

Another object is the provision of means for controlling the operation of automatic dispensing equipment which may be used with the apparatus.

A further object is the provision of means for determining the total quantity of material dispensed by the apparatus at any time during the operation thereof.

A further object is the provision of means for charging certain of the receptacles under the control of the drop-counter means while others of the receptacles are being charged simultaneously without the use of said means.

The invention and the above mentioned and other objects, features and advantages thereof will be fully understood from the following description considered in connection with the accompanying illustrative drawings.

In the drawings:

Fig. 1 is a perspective view of an automatic fraction-collection apparatus embodying the present invention;

Fig. 2 is a plain view, partly in section, on the line 2—2 of Fig. 1, with parts cut away for the purpose of illustration;

Fig. 3 is a vertical sectional view on the line 3—3 of Fig. 2;

Fig. 4 is a sectional view on the line 4—4 of Fig. 3;

Fig. 5 is a view similar to Fig. 2 with parts removed for the purpose of illustration;

Fig. 6 is a plan view partly in section, of a mechanism forming part of the apparatus, showing said mechanism in one operating position thereof;

Fig. 7 is a fragmentary view showing the mechanism of Fig. 6 in another operating position thereof;

Fig. 8 is a fragmentary view showing the mechanism of Fig. 6 in still another operating position thereof;

Fig. 9 is a view similar to Fig. 6 showing said mechanism in its inoperative position;

Fig. 10 is a sectional view on the line 10—10 of Fig. 6;

Fig. 11 is a sectional view on the line 11—11 of Fig. 6;

Fig. 12 is a sectional view on the line 12—12 of Fig. 6;

Fig. 16 is a sectional view taken on line 16—16 of Fig. 13;

Fig. 17 is a sectional view taken on line 17—17 of Fig. 13;

Fig. 18 is a sectional view taken on line 18—18 of Fig. 5;

Figs. 19 and 20 are fragmentary views of a portion of the apparatus illustrated in Fig. 5 showing different operative positions thereof;

Fig. 21 is a top plan view of a portion of the apparatus as shown in Fig. 1;

Fig. 21A is a view similar to Fig. 27 with control unit 400 removed and bracket 44 in an alternative position;

Fig. 22 is a side view of the portion illustrated in Fig. 21;

Fig. 23 is a sectional view taken on the line 23—23 of Fig. 22;

Fig. 24 is a sectional view taken on the line 24—24 of Fig. 22;

Fig. 25 is a sectional view taken on the line 25—25 of Fig. 21 with parts omitted;

Fig. 26 is a sectional view taken on the line 26—26 of Fig. 21;

Fig. 27 is a sectional view taken on the line 27—27 of Fig. 21 with parts omitted, and portions shown in elevation;

Fig. 28 is a top plan view of the light control housing with the cover thereof removed;

Fig. 29 is a sectional view taken on the line 29—29 of Fig. 22, portions thereof being shown in elevation;

Fig. 30 is a sectional view taken on the line 30—30 of Fig. 26;

Fig. 33 is a circuit diagram of a pump control unit used with the main control unit;

Fig. 34 is a circuit diagram of a pump control unit that may be used with the auxiliary control unit;

Fig. 35 is a circuit diagram of an alternative pump control unit that may be used with the auxiliary control unit; and Fig. 36 is a perspective view of the auxiliary control unit.

Figure 13:
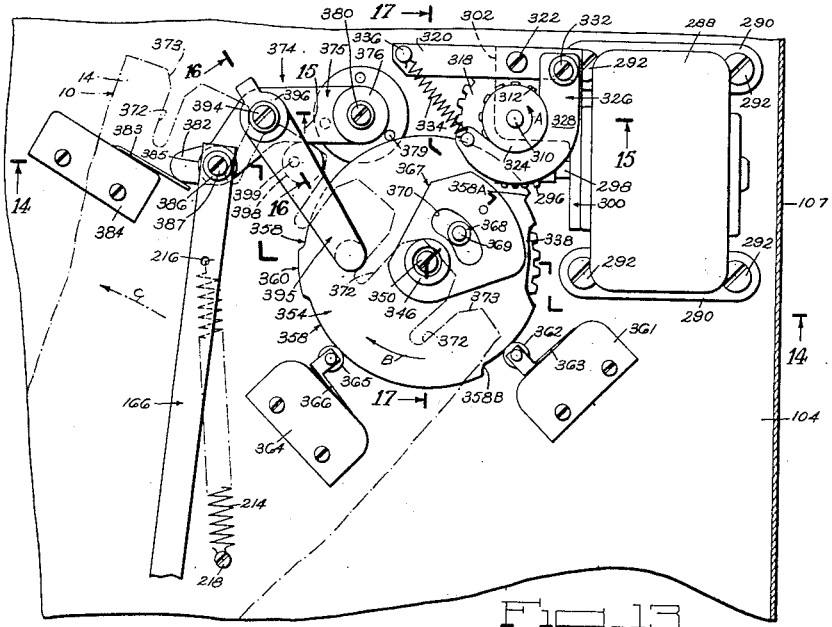
Fig. 13 is a plan view of another mechanism forming part of the apparatus.

Briefly described, the apparatus of the present invention comprises a movable rack or support on which a plurality of receptacles are arranged in each of a plurality of laterally related rows, each of which extends in the direction of movement of the rack. A liquid or other material-supply device is associated with the apparatus and includes a funnel device having a passage therethrough for the liquid, or other substance which is to be supplied to said receptacles, mounted for movement laterally of the receptacle-rows of the rack for directing the material to the receptacles in the different rows. The rack is moved step by step to carry each receptacle to a position at the outlet of the directing means or funnel for the supply of the substance to each receptacle. When the substance is to be supplied to more than one row of receptacles, the funnel is moved automatically from one row to another. Provision is also made for simultaneously supplying the receptacles of different rows. Means including a timing device, which may be either a time-responsive device or a drop-counter for accurately determining and measuring the quantity of substance to be supplied to each of said predetermined number of receptacles, are preferably utilized, but other charge-measuring devices (for example but without limitation, pumps) may be used within the scope of the invention. Suitable means such as an electric motor is utilized for actuating the rack-moving mechanism and provision is made to terminate the operation of the apparatus as soon as the last receptacle is charged. Provision is also made for synchronizing the operation of the apparatus with the operation of automatic dispensing equipment. In addition, means are provided for indicating the total quantity of material dispensed by the apparatus at any time during the operation thereof. These various provisions may be utilized separately and where appropriate they may be used in certain combinations.

The apparatus, in the form herein described, was specifically designed for use as a fraction-collector in chromatographic analysis. See for example, "Principles and Practice of Chromatography" by Zechmeister and Cholnoky, Translated by Bachrach and Robinson, published by John Wiley & Sons, Inc., New York. In this particular use of the apparatus, a liquid is passed through or in contact with an adsorbent substance of the column in a tube, according to known practice in the art of chromatography, and issues from the outlet of said tube drop by drop, and similarly passes, drop by drop, through the passage of the above mentioned funnel device. It will be understood that the duration of the interval between two successive movements of the rack determines the quantity of liquid supplied to each receptacle, and that this interval of rest of the rack is controlled by the counter or other timing device which controls the operations of the motor which moves the rack. It is to be understood, however, that the apparatus may be used for various purposes other than chromatography and has a much wider application especially when used with the aforementioned automatic dispensing equipment.

The apparatus will now be described in detail with reference to the above mentioned use thereof, but it will be understood that, as previously stated, it may be used for other purposes.

In the use to which the apparatus is presently being put, accurately measured uniform quantities of liquid are collected in a multiplicity of test tubes or other suitable receptacles or containers which, in the form of the apparatus herein disclosed, are carried by a rotatable rack 10 (Figs. 2 and 3). The liquid receiving receptacles or containers, a few of which are indicated at T in Fig. 3, are disposed in each of a plurality of laterally related rows, here shown as circular rows, the rack or container-supporting means 10 being circular. The containers are held removably in upright position and in uniform circumferentially spaced relation in each row by the horizontal plates or discs 12 and 14 which are secured in vertically spaced relation by the spacing posts 16. For this purpose, plate 12 is provided with a plurality of circumferentially spaced circular openings 18 for the outermost row of containers, and similar openings are provided in plate 12 for each of the other rows, there being four of such rows, in the apparatus as now constructed, as shown in Fig. 2. The lower plate 14 is similarly provided with four circular rows of circumferentially spaced openings as indicated at 20 in Figs. 2 and 3, the openings in each row being in registry with the openings in the respective rows of plate 12 to support and positon the test tubes. To facilitate the insertion of the receptacles into the openings 20 in the lower plate 14, an intermediate plate 13 is mounted between plates 12 and 14. Said intermediate plate is maintained in spaced relation to the other plates by sleeves 15 and 17 which are disposed on the spacing posts 16, above and below, plate 13 through which said posts extend, said intermediate plate being provided with circular openings 19 in registry with openings 18 and 20. It will be apparent that by inserting a receptacle in openings 18 and 19, said receptacle will be properly positioned for insertion in openings 20. Openings 20 (Fig. 4) are preferably square, rather than circular, so that any excess of liquid which flows down the sides of the receptacles will have sufficient space between the sides of openings 20 and the outer surface of the receptacle to flow through the lower plate 14 and into a drain pan 23 which is placed beneath said lower plate below the receptacles charging station. It will be noted, however, that said square openings are sufficiently small to prevent the test tubes from moving downwardly therethrough. If preferred, a drain pipe (not shown) may be provided for the drain pan.

The lower plate is also provided with a downwardly projecting pin 21 (Fig. 3), the function of which will presently appear.

Rack 10 is mounted for rotation about a vertical axis, as hereinafter more particularly described, and is moved intermittently, i. e., stepwise, for presenting each of the containers of each row successively at the liquid-receiving station at which the material-supply device 22 (Fig. 1) is mounted. It will be noted that the rack is disposed removably within a stationary housing 24 provided with a removable cover 26 and that the latter has a slot or opening 28 to allow the passage of the liquid from the outlet 30 of unit 22 through a funnel 32 into the receptacle T at the liquid-receiving station, said liquid also passing through a control unit 400 when the latter is positioned between the funnel outlet 34 and said liquid-receiving station. When used, the control unit 400 carries funnel 32 and is mounted for controlled step movement laterally of the rows of containers into positions in which the liquid outlet 402 (Fig. 27) of said control unit registers with the containers in each of the laterally related rows, respectively, of the rack. More particularly, the control unit 400 may be first positioned in registry with the innermost row of containers so as to supply liquid to each of the containers in said innermost row of containers during one revolution of rack 10, after which the control unit is pivoted so that outlet 402 is moved in succession outwardly to the other rows for supplying liquid to each of the containers of each of said other rows during the next three revolutions of the rack. However, it will be understood, as hereinafter described in detail, that the funnel 32 may be mounted directly, i. e., without the use of said control unit, for said controlled step movement laterally of the rows of containers into positions in which one liquid outlet 34 of the funnel registers with the containers in each of the laterally related rows, respectively, of the rack.

The control unit 400 is removably mounted for pivotal movement on a rotatable support or stud 46 projecting above the upper housing wall 47. Said stud is provided with the centrally disposed pin 404 (Fig. 27) and with a smaller pin 406 laterally thereof, the control unit being provided with a flanged bushing 408 having a bore 410 extending therethrough and a bore 412 in its flanged portion, in which the respective pins are engageable, for removably mounting the control unit. It will be understood that pin 406 serves both as an automatic positioning means for correctly positioning the control unit and, in addition, retains the latter against rotation relative to the stud.

As hereinafter more particularly described, said control unit turns with the support or stud 46 about the vertical axis of the latter in pivotally moving the funnel from one row of containers or receptacles T to each of said other rows. Accordingly, both the funnel outlet 34 and the control unit outlet 402 are movable in an arcuate path from one row of receptacles to another. In this connection, it will be noted that opening 28 of cover 26 is arcuately shaped and has its center of curvature at the axis of stud 46, and further it will be observed that, as clearly shown in Fig. 2, the laterally aligned openings in plates 12 and 14 are disposed along the arc of a circle which has its center at the axis of stud 46 when each set of laterally related openings of the several rows are at the liquid-receiving station, as indicated at 48 in Fig. 2.

Referring now to Figs. 21 through 30, the control unit 400 comprises the casing 414 provided with a bottom wall 416 and opposing side walls 418 and 420 upstanding therefrom and preferably integral therewith. End walls 422 are preferably formed of substantially opaque meshed ventilating material and are removably insertable in longitudinally slotted portions 424 of said opposing walls and engage in a transversely slotted portion 426 in said bottom wall. Said side walls are provided at their upper marginal edges, with the nibs 428 having the reduced parts 430 which are engageable in apertured portions of a cover member 432 for mounting the latter in spaced disposition relative said upper marginal edges of the side walls to provide ventilation for the control unit. Said control unit is provided with a photo-electric cell 434 and with a companion exciter lamp 436 suitably mounted and disposed in housing 414. Cell 434 is provided with an opaque light mask 435 which covers the light sensitive surface thereof for preventing light, from any source but lamp 436, from reaching the cell. For this purpose the mask has a slit 437 aligned with the lamp. A condensing lense 438 mounted in a U-shaped support 440 is disposed in the light path between said exciter lamp and said photo-electric cell. To provide for focusing or for adjustably positioning said lens axially of housing 414, each arm 442 of said support is provided with a thumb-screw 444 which extends through an axial slot 446 in each of the side walls of housing 414.

Provision is made for converting the material which issues from the free-flowing outlet 34 of funnel 32 into drop form and for directing said drops to pass through a transparent tube 447, mounted in a suitable manner about the outlet 402 of control unit 400, and through said outlet after intercepting the light path between lamp 436 and photo-cell 434, said tube being disposed between said lamp and photo-cell. Pursuant thereto, the upper marginal edges of side walls 418 and 420 are recesed, as at 448, for receiving the channel seat member 450 in disposition transversely of the housing 414, said member being centrally apertured, as at 452. The cover 432 is formed of the companion abutting parts 454 and 456, each provided with a semi-circular cut-out 458 and having opposing marginal edge cut-outs 460 whereby said parts abut the sides of the upstanding portions 462 of the channel, as illustrated in Figs. 27 and 29. It will be understood that the companion semi-circular cut-outs 458 together form an aperture which is in register with the channel aperture 452, both of which apertures are in register with outlet 402 of the control unit. A plate 466, centrally apertured as at 468, and provided with the axially extending slots 470, on either side of said aperture, is mounted on the channel member 450. Thumb-screws 472 extend through said slots 470, respectively, into bores 474 in said channel member for mounting said plate thereon. Due to said axial slots, it will be apparent that the plate is adjustable transversely of housing 414. A flanged hub 476 is mounted on said plate, as by screws 478, being notched, as at 480, for accommodating the thumb-screws 472. Said hub is provided with a cylindrical-passageway 482 in which there is disposed a sleeve 484 and a centrally apertured resilient chuck or stopper 486. The stem 488 of a funnel 490 is mounted in said chuck, said stem being provided with a drop forming outlet 492. The hub is provided with a thumb-screw 494 which clamps sleeve 484 against the chuck for retaining said stem firmly in position. It will be apparent that funnel 490 may be adjusted vertically of housing 414 by withdrawing thumb-screw 494 and that it may be adjusted laterally of the housing by the lateral adjustment of plate 466, as previously described, both for aligning drop-outlet 492 with outlet 402 of the housing, and for directing the material issuing therefrom, across the light path. A window 496 is provided in sidewall 418 of the housing to aid in properly positioning the funnel.

In order to mount funnel 32 on control unit 400, bushing 408 extends through and above cover 432 and is provided with a thumb-screw 498 for releasably retaining post 500 in the central bore 410 thereof. A platform 502, provided with a locating pin 504, is fixedly mounted on said post intermediate the ends thereof. It will be apparent that the spacing of said platform from the top of housing 414 may be adjusted by the adjustment of post 500 axially of bushing 408. A funnel support or bracket 44 is provided with a mounting portion 506, apertured at 508 and 510, for releasably engaging the locating pin 504 and post 500, respectively, for removably mounting the bracket on platform 502. It will be apparent that pin 504 retains the bracket against rotation relative to platform 502. The upper portion 512 of the bracket slopes downwardly and is provided with a raised portion 514 which is grooved, as at 516 (Fig. 23), for receiving the tubular part or liquid passageway 38 of funnel 32. Said bracket portion 514 is provided with the spaced helical tension springs 518, 518, each of which has one end secured thereto, as at 520, the other end being secured to a latch member 522 provided with a fingergrip 524. Said latch member is slotted as at 526, and cooperates with a pin 528 carried by bracket part 514, the head of said pin being smaller than the latch member slot. In order to releasably retain funnel 32 in groove 516, the springs overlie funnel part 38 and the latch member is engaged by the pin, springs 518 urging said member upwardly against the shank of the pin, as illustrated in Fig. 23, the head of the pin preventing the disengagement thereof. To unlatch member 522, for removing the funnel, the finger-grip 524 is pulled down until the pin head disengages the latch member and the latter is then moved laterally so that slot portion 526 is removed from the pin. It will be understood that by adjusting platform 502 axially of bushing 408 the downturned outlet 34 of funnel 32 may be positioned within funnel 490, as illustrated in Fig. 22.

As illustrated in Fig. 1, the liquid, which is supplied to the receptacles in the rack 10, is provided in a supply container 50 having an adjustable valve 52 at its outlet from which the liquid flows through a tube 54 of the column for treatment by a substance contained therein, depending upon the process for which the apparatus is to be used. From the outlet 30 of the tube 54 the liquid flows intermittently, i. e., drop by drop, the drops being of the same volumetric size, into the mouth 36 of the funnel 32 carried by the bracket 44. The drops of liquid pass through the outlet 34 of the funnel 32 into the funnel 490 carried by the control unit 400. The drops of liquid then pass through the housing 414, falling between the photo-electric cell 434 and the exciter lamp 436 and through outlet 402 into a receptacle T. As each drop of liquid passes across the path of light from the lamp to the photo-electric cell, a relay, subsequently described, is operable under the control of said photo-electric cell, and mechanism, subsequently described, operates under the control of said relay, after the predetermined drops of liquid are supplied to the test tube at the liquid receiving station, to turn the rack 10 one step whereby to bring the next tube in the position at the liquid receiving station. More particularly, the passage of each drop of liquid between the photo-electric cell and the exciter lamp interrupts the light to the cell and initiates an electric impulse which is transmitted to a suitable impulse counter mechanism which is adjustable and may be preset so as to automatically control the intermittent movement of rack 10. Bracket 44 and funnel 32 move as a unit with the control unit 400, all pivoting about the axis of stud 46. Rack 10 is turned intermittently in order to carry the liquid-receiving receptacles T successively to the liquid-receiving station and allow sufficient time for each receptacle at said station to receive a predetermined quantity or charge of liquid. After all or any predetermined number of the receptacles in one row are supplied with the predetermined quantities of liquid, control unit 400 and funnel 32 are automatically moved to the next row, it being noted that mouth 36 is always disposed in registry with outlet 30, regardless of the position of funnel outlet 34 and control unit outlet 402. To maintain outlet 30 in position to drop liquid into funnel 32, container 50 and tube 54 are carried by supports or brackets 56 and 58, respectively, which are releasably and adjustably secured to the vertically disposed rod 60 in any suitable way, as by clamping screws 62 and 64, respectively. Rod 60 is secured at each of its ends in a support 66 which is adjustably and releasably secured, as by clamping screws 68, to an upright post 70 carried by brackets 72 secured to side wall 73 of housing 24.

In the apparatus which has been constructed and operated pursuant to the present invention, there is provision for 50 test tubes in each of the four rows, or a total of 200 test tubes. As will hereinafter appear, the apparatus may be set so as to supply a predetermined quantity of liquid to all of the 200 test tubes or to any predetermined smaller number of test tubes, according to requirements. Upon the termination of the test tube filling process control unit 400 and funnel 32 are automatically moved to discharge the liquid into a drain 74 removably secured in pinch clips 76 affixed to side wall 77 of housing 24, said drain permitting the excess liquid to be discharged through tubing 78 into a receptacle (not shown). Housing wall 77 is provided with a window 80 and with a light source 82 (Fig. 3), here shown as a fluorescent light, whereby the receptacles and the contents thereof may be inspected without requiring removal of the rack from the housing.

Provision is also made for operating the apparatus under the direct control of a timing device without the control unit 400. Under these circumstances, the control unit may be bodily removed from stud 46 by disengaging the bushing 408 of the control unit from the pins 404 and 406 carried by the stud 46. The bracket 44 may similarly be disengaged from platform 502 by disengaging it from the pin 504 and post 500. Said bracket may then be bodily mounted on stud 46 by engaging the pins carried by the latter in the apertures of the bracket, as in Fig. 21A, in the same manner as when mounting the bracket on said platform. It will be understood that the bracket will now turn directly with the stud 46 about the vertical axis of the latter in pivotally moving the funnel from one row of containers or receptacles to each of the other rows. Accordingly, the funnel outlet 34 will be movable in an arcuate path from one row of receptacles to another. The supply mechanism 22 will be moved downwardly and adjusted in position so that the liquid from outlet 30 of the tube 54 will flow into mouth 36 of funnel 32 and pass through the outlet 34 thereof into a test tube in the liquid receiving station. After the predetermined charge of liquid is supplied to the test tube, the rack is again turned one step whereby to bring the next test tube into position at the liquid receiving station. More particularly, means are provided for interrupting the motor which turns rack 10 for a predetermined interval while each test tube is in liquid-receiving position, said interval determining the amount of liquid that is supplied to the test tube, said motor being energized at the end of said interval to move the next tube into liquid-receiving position whereupon the motor is cut off and the cycle is repeated. In this manner rack 10 is turned intermittently in order to carry the liquid-receiving receptacles T successively to the liquid-receiving station and allow sufficient time for each receptacle at said station to receive a predetermined quantity or charge of liquid. After all, or any predetermined number of the receptacles in one row, are supplied with the predetermined quantities of liquid, funnel 32 is automatically moved to the next row, it being noted that mouth 36 is always disposed in registry with outlet 30, regardless of the position of the funnel outlet 34.

Provision is also made for simultaneously supplying fluid to two rows of receptacles, whether or not the control unit 400 is utilized. An additional funnel 32A is removably mounted on a bracket 44A (Fig. 26) which is similar in all respects to bracket 44 except that it is provided only with the aperture 508A in the mounting portion 506A thereof. Bracket 44A is removably mounted on a supporting plate 530 which is mounted on the upper wall 47 of housing 24, said wall being provided with an underlying plate 532 secured thereto by screw 534 for this purpose. A pivot post 536 (Fig. 25), having a reduced portion 538, is mounted on wall 47, said reduced portion extending through an aperture 540 in plate 530 for pivotal movement of the latter thereon. Washer 542 and screw 544 retain plate 530 for said pivotal movement, said screw securing the post to wall 47 and underlying plate 532. An additional post 546 is mounted on wall 47 and spaced from post 536. Said post 546 is provided with a reduced portion which is pressed into plate 530. A thumb screw 548 retains the plate on post 546 for preventing pivotal movement of the plate relative to post 536. However, it is apparent that upon the withdrawal of the thumb screw, plate 530 is freely pivotal on post 536, post 546 being slidable on wall 47. At its free end, plate 530 fixedly carries the support member 550 which is provided with the upstanding post 552 which is engageable in aperture 508A of bracket 44A. A link 554 (Figs. 26 and 30) is secured at one end thereof to bracket 44A through a spacing member 556 by screw 558. An aperture 560, at the other end of the link, is engageable, either with a depending pin 562 (Fig. 22) carried by a plate 564 on bottom wall 416, of the control unit 400, or with a depending pin 566 carried by bracket 44 (as illustrated in Fig. 21A) depending upon whether or not the control unit 400 is being used. It will be understood that bracket 44A is freely pivotal on post 552 so that when it is operatively connected, through link 554, to either the control unit 400, as in Fig. 22, or the bracket 44, as in Fig. 21A, it will follow the movement of either said control unit, or said bracket 44, as either of the latter elements is moved by stud 46 from one row of receptacles to another row. Link 554 preferably is so dimensioned that with funnel 32 positioned, for example, to fill the third row of receptacles, counting outwardly from the center of the rack, funnel 32A will automatically be positioned over the innermost row. As funnel 32 moves to the outermost row, funnel 32A will move to the second row. When the outermost row has been filled, funnel 32 will be moved clear of the housing to discharge down drain 74, as hereinafter described. This movement will also carry funnel 32A clear of the housing to discharge its excess contents down the drain, it being understood that the mouth of the drain, in this event, will be wide enough to accommodate both funnels. It will also be understood that when both funnels 32 and 32A are utilized, additional material supply means 22 may be provided for the additional funnel. However, it will also be understood that either or both funnels may be fed directly by any suitable automatic dispensing apparatus, such as is hereinafter described. Therefore, it will be apparent that funnel 32 may be used either with, or without, the control unit 400 to supply the receptacles, and in either case, if desired, the additional funnel 32A may also be used concommitantly therewith. When funnel 32A is used, thumb-screw 548 is withdrawn and plate 530 is pivotable on post 536 to carry funnel 32A clear of the apparatus. It will be noted from Fig. 26 that funnel 32A is provided with a constricted or dropper outlet 34A, while funnel 32 has a free-flow outlet 34. Ordinarily the funnel with the free-flow outlet is used when the liquid is supplied thereto drop by drop, as from the drop outlet 30. It will also be understood that funnels 32 and 32A are freely interchangeable, and, if desired, both may be of similar construction.

Rack 10 is mounted for turning movement on a stationary vertical shaft or post 84 (Fig. 3), said rack being provided at its center with a cylinder 86 secured to plates 12 and 14, said cylinder being secured to the spaced flanged bearing bushings 88 and 90, each of which is pressed into one end of the cylinder. The lower bushing 90 is supported on the horizontal bearing portion 92 and said bushings are rotatable on said shaft. A reduced end portion 94 of the shaft projects through the center of cover 26, said cover being disposed on upper housing wall 47 to overlie the circular opening 96 therein (Fig. 3). With feed unit 22 rotated clear of housing 24 and with brackets 44 and 44A pivoted clear of cover 26, the cover may be removed and the rack may then be removed through opening 96. Thus, it will be noted that the rack is conveniently portable. A reduced portion 98 of stationary shaft 84 is mounted in upright position in a fixed cylindrical flanged bushing 100 secured by screws 102 in the center of the upper surface of bottom wall 104 of housing 24.

The mechanism for positioning funnel 32 and control unit 400 to transmit the liquid into a predetermined row of receptacles and thereafter to automatically pivot the funnel and control unit to charge the receptacles in the next outermost row comprises the link assembly 106 (Fig. 5) operated by the control unit 108 (Fig. 1), the pawl unit 111, and the ratchet plate 113 (Figs. 6–9, and 12). Control unit 108 is provided with the rotatable shaft 110 (Fig. 18) having an upper end portion 112 which extends through a bearing bushing 114 secured in the upper housing-wall 47. A collar 115 secured to shaft 110 by screw 117 prevents upward movement of said shaft. Control knob 116, provided with an indicator 118, is fastened to shaft portion 112 for manually rotating the shaft. The lower end of said shaft is mounted for rotation in a flanged bearing bushing 120 secured in bottom wall 104 by screws 122. A cylindrical member 124 having a horizontal cam 126 is mounted on shaft 110 by a set screw 128. The free end of cam 126 is notched, as at 130 (Fig. 5).

In a predetermined position (Fig. 20) of shaft 110, as set by control knob 116, the cam 126 engages a circular cam follower member 132 carried by link 134 and holds it in a predetermined position. Link 134 is provided with a longitudinal slot 136 in which is disposed the neck 138 of a vertically mounted guide stud 140 which is secured on the upper surface of bottom wall 104 by a screw 142 and a washer 144, said stud serving to guide link 134 when it is moved by shaft 110 from its retracted position shown in Fig. 5 to its projected position shown in Fig. 20. Cam follower member 132 is secured to the lower surface of link 134, at the free end thereof, by screw 146, and is stepped, as at 148. In the retracted position of link 134, the non-circular peripheral portion 150 of cam 126 is disposed adjacent member 132. However, as knob 116 is rotated, the circular peripheral portion 152 of the cam engages member 132 and urges link 134 to its projected position, as illustrated in Figs. 19 and 20. In the fully projected position of the link, notch 130 snaps into engagement with step 148 to retain the link in said position. The inner end of link 134 is secured by a pivot screw 154 to a horizontally disposed lever 156 which is centrally apertured and mounted for rotation on portion 92 (Fig. 3) of rack shaft 84. Lever 156 is provided, at each end thereof, with a guide member 158, 160, respectively, similar in construction and arrangement to the guide member 140, and disposed in the same manner, in longitudinal slots 162 and 164, respectively, of links 166 and 168, respectively. Link 166 is pivotally secured to a pivotally mounted member 375, hereinafter described in detail, and link 168 is apertured for mounting on the reduced portion 170 (Fig. 12) of a vertically disposed post 172. The latter is provided with a central bore 174 for a screw 176 provided with washer 178, said screw mounting said post on the free end 180 of pivoted plate 182 of pawl unit 111. Plate 182 is pivotally secured at its other end to bottom wall 104 of housing 24, adjacent the corner formed by the intersection of side walls 73 and 77. More particularly, said plate is provided with a bushing 184 in which is disposed screw 186 which is threaded into bottom wall 104 and secured thereto by nut 188, a washer 190 being disposed between the screw and the upper surface of plate 182. Plate 182 is also provided with a transverse slot 192 (Fig. 6) in which is disposed screw 194 secured to bottom wall 104 by nut 196 (Fig. 12) said screw extending above plate 182 and being provided with a washer 198 which overlies the slot and is biased against the plate by spring 200 mounted on screw 194 to retain the plate against vertical movement.

With cam 126 disengaged from cam follower 132, as in Fig. 18, the link assembly 106 is in the condition illustrated in Fig. 5. As knob 116 is rotated, the peripheral portion 152 of cam 126 engages follower 132 to move link 134 toward its projected position. Assuming that the knob has been rotated to position the parts, as illustrated in Fig. 19, wherein cam 126 has been rotated approximately 90° from its position in Fig. 5, it will be apparent that lever 156 has been pivoted in a counter-clockwise direction, viewing Fig. 5, so that post 158, carried thereby, has moved link 166 forwardly to pivotally move member 375 for unlocking rack 10, as hereinafter described, so that the rack may be freely and manually rotated. It will be understood that post 160 and slot 164 comprise a lost-motion mechanism so that the aforementioned movement of the lever has had no effect upon link 168 since said post will now be positioned in slot 164 inwardly of both ends thereof. However, when knob 116 is further rotated in the same direction so that link 134 is further projected, as illustrated in Fig. 20, and lever 156 has been pivoted to the maximum counter-clockwise disposition thereof, post 160 has been moved sufficiently along slot 164 to engage the opposite end thereof to move link 168 to the projected position thereof. The counter-clockwise movement of lever 156 is in opposition to the bias of spring 202 which is connected to pin 204 on bottom wall 104 and to the lever as at 206. The projection of link 168 to its maximum extent causes pawl plate 182 to pivot about screw 186 to its projected position, as shown in Fig. 9, Fig. 6 illustrating the retracted position of plate 182. Link 168 is retracted by a spring 208 which is secured at one end to link 168, as at 210, and secured at its other end to pin 212 (Fig. 5), fixed to bottom wall 104. It will also be noted that link 166 is biased by spring 214, secured thereto at 216 and to pin 218, in a direction opposite to the bias of springs 202 and 208 so that when cam 126 is rotated beyond the position shown in Fig. 20, lever 156 is urged in a clockwise direction, viewing Fig. 5, and link assembly 106 resumes its inoperative position, illustrated in Fig. 5.

Plate 182 is also provided with a cylindrical part 220 provided with an internal recess or seat 222 (Fig. 12), said part being mounted for rotation about a post 224 mounted on the plate by screw 226 and provided with a circular head portion 228 disposed in said recess. Part 220 has an arcuate portion 230, above said recess, which is provided with the integral horizontally extending arms 232 and 234 forming a double-acting pawl 236 which is biased for counter-clockwise rotation, viewing Fig. 6, by a spring 238 secured to arm 234 and to a pin 240 mounted on plate 182. Detent 242 limits said counter-clockwise rotation of pawl 236 which cooperates with ratchet plate 113, which is operatively connected to bracket 44 for turning the latter and funnel 32 carried thereby. Support stud 46 (Fig. 10), on which said bracket is mounted, has a part 244 which projects through upper wall 47 and is disposed in the upper portion of a rotatable vertically disposed cylinder 246 which is provided with a transverse slot 248 through which screw 250 projects for securing the stud in said cylinder, said slot allowing for adjustably positioning the stud in the cylinder. Said cylinder is mounted on a vertically disposed stationary shaft 252 which is secured in a flanged mounting member 254 secured to bottom wall 104 by screws 256, bushings 258 and 260 being pressed into the cylinder and providing bearing surfaces for the cylinder.

Ratchet plate 113 is press-fitted onto cylinder 246, at the bottom thereof, and overlies member 254. It will be understood that ratchet plate 113 is rotatable with cylinder 246 about shaft 252. Plate 113 is provided with a transverse slot 262 through which there extends a screw 264 which is engaged in a post 266 (Fig. 11) mounted in member 254, a spring 268 being mounted on the extended shank of said screw for biasing a washer 270 against the upper surface of the plate to guide the latter and to prevent vertical motion thereof, said post serving as a support for the plate. Plate 113 is biased for clockwise rotation about shaft 252, viewing Fig. 6, by a spring 272 connected to the plate at 274 and to the aforementioned pin 212, a detent 276 secured to the bottom wall serving to limit said clockwise rotation thereof, as illustrated in Fig. 9. It will be noted that said detent is mounted eccentrically about the threaded portion 278 (Fig. 12) thereof for adjusting the disposition thereof. It will be understood that screw 264 serves to limit the counter-clockwise rotation of the plate, as illustrated in Fig. 6. Plate 113 is also provided with a downwardly extending part 280 which operates the external operating part 281 of a switch 282, here shown as a microswitch, when said plate is in its extreme clockwise position, as illustrated in Fig. 9, the purpose of which is hereinafter described. The ratchet plate 113 is provided with five ratchet teeth T1, T2, T3, T4 and T5 which cooperate with the vertical portions 284 and 286 of the arcuate part 230 of cylindrical member 220, as hereinafter described.

It will be understood that when knob 116 is turned so that indicator 118 points in the direction opposite that shown in Figs. 1 and 18, cam 126 engages follower 132 and operates lever 156 whereby link 168 pivots lever 182 in a counter-clockwise direction, viewing Fig. 5, to its projected position whereby pawl 236 is disengaged from the ratchet plate. In this position, bracket 44 is manually operable to rotate feed funnel 32, from its position shown in Fig. 1, wherein the ratchet plate is positioned as in Fig. 6, in a counter-clockwise direction, viewing Fig. 1, to a position wherein outlet 34 and/or outlet 402 is in registry with drain 74, in which latter position the ratchet plate, having been also rotated in a counter-clockwise direction, abuts stop 276, as in Fig. 9. It will be apparent that with the pawl and ratchet plate disengaged, outlet 34 and/or outlet 402 may be positioned to fill the receptacles in any desired row. Assuming now that it is desired to fill each row of receptacles, bracket 44 is turned to the position shown in Fig. 1. Knob 116 is now turned until indicator 118 points to side wall 77 thereby indicating that cam 126 is positioned, as shown in Fig. 5, whereby the pawl unit 111 is in its retracted position and ratchet tooth T1 is intermediate pawl portions 284 and 286, tooth T2 abutting portion 286. We shall also assume that the outermost receptacle at the liquid filling station is positioned immediately behind pin 21 on rack plate 14, considering the rack to rotate in a counter-clockwise direction viewing Figs. 1 and 2. If desired, the rack may carry a suitable indication to show the position of pin 21. After the rack has made one complete rotation, as hereinafter described, to fill all the receptacles in the innermost row, pin 21 will be in the position illustrated in Fig. 6. As the rack continues to rotate in a counter-clockwise direction, pin 21 moves against pawl arm 232 whereby the pawl is caused to rotate in a clockwise direction about post 228 and assumes the position shown in Fig. 7 wherein pawl portion 286 having released tooth T2, spring 272 has caused the ratchet plate 113 to rotate in a clockwise direction on shaft 252 until tooth T1 abuts pawl portion 284. As soon as pin 21 clears arm 232, the arm 234 is retracted by spring 238 into engagement with detent 242 thereby rotating the pawl in a counter-clockwise direction and momentarily releasing the ratchet plate for clockwise rotation by spring 272 until portion 286 abuts tooth T3 (Fig. 8). It will be noted that tooth T1 is now positioned beyond cylindrical part 229 and tooth T2 is positioned intermediate pawl portions 284 and 286. It will be apparent that the movement of the ratchet plate from the position shown in Fig. 6 to that shown in Fig. 8 has caused the lateral movement of funnel 32 from its position in which outlet 34 and/or outlet 402 is in registry with the innermost receptacle row to a position in which outlet 34 is in registry with the adjacent row of receptacles. It will also be apparent that when tooth T1 is intermediate pawl portions 284 and 286, funnel 32 is positioned to fill the innermost receptacle row and when tooth T2 is intermediate said pawl portions, funnel 32 is positioned to fill the next outer row. It will be understood that the above described action of the pawl and the ratchet plate is repeated each time that pin 21 engages the pawl whereby outlet 34 and/or outlet 402 is moved laterally, step-wise, into registry with each row until tooth T5 clears the pawl, as in Fig. 9, whereby the ratchet plate is rotated in a clockwise direction by spring 272 until it abuts stop 276 which is adjusted so that outlet 34 and/or outlet 402 registers with drain 74. In this position normally closed switch 282 is opened by member 280 to automatically interrupt an electric circuit and thus terminate the operation of the apparatus, as hereinafter described.

It will be understood that if it is desired to fill less than the total number of receptacles, for example 100, control 108 is operated, as described to disengage the pawl and ratchet and outlet 34 and/or outlet 402 is positioned in registry with the first receptacle behind pin 21 in the third row counting from the innermost row. Upon operating control 108 to move link 134, for releasing ratchet 113 from its control pawls, bracket 44 may then be freely moved, manually, to position the funnel outlet 34 and/or outlet 402 at said third row and, upon return movement of knob 108 to its initial position, tooth T3 is automatically positioned between parts 284 and 286. If it is desired to include only a portion of any row in the filling operation, e. g. in filling 75 receptacles, funnel 32 is positioned as for filling 100, and the rack is manually rotated until the 26th receptacle behind pin 21 in said third row is in the liquid filling station. The apparatus is then operated in the ordinary manner. It will therefore be apparent that the apparatus can be adjusted to fill any desired number of receptacles.

The mechanism for intermittently rotating the rack will now be described with reference to Figs. 13 through 17. A motor 288 is mounted on a frame 290 bolted as at 292 to bottom wall 104 adjacent the corner formed by side wall 107 and side wall 294 of the housing, said motor having a worm 296 secured to the shaft 298. A bracket 300 is secured to said motor, said bracket being provided with the horizontally spaced parts 302 and 304 provided with bushings 306 and 308, respectively, in which a vertically disposed shaft 310 is mounted for rotation. Said shaft is provided with a gear 312, said gear being spaced from bushings 306 and 308 by sleeves 314 and 316, respectively. Gear 312 is driven by worm 296 for rotating shaft 310, the lower end of said shaft being mounted in a gear 318 rotated thereby. A support plate 320 is secured to the bracket part 302, as by screw 322, said plate being apertured and the free upper end of shaft 310 extending therethrough. At its free end and spaced from plate 320, said shaft carries a cylindrical brake drum 324, preferably formed of aluminum, which cooperates with a brake shoe 326, preferably formed of Bakelite, and having a portion 328 shaped to frictionally engage the drum. One end of said brake shoe is mounted for pivotal movement about a post 330 carried by plate 320 and secured thereon by a bolt 332 which extends through the plate and into part 302. The other end of the shoe is engaged by a spring 334 which is tied to a post 336 carried by said plate and which biases shoe portion 328 to frictionally engage said drum. A gear 338 is mounted for rotation on a flanged support 340 secured to bottom wall 104 by screws 342. Support 340 is provided with a vertical shaft 344 which extends into a collar 346 on the upper surface of gear 338, said collar having a recess 348. A screw 350 threaded into shaft 344 retains a washer 352 in recess 348 whereby gear 338 rotates on said shaft and is secured against vertical displacement. Gear 338 meshes with gear 318 and is driven thereby. A cam 354 is pressed onto collar 346 and is fixedly mounted on the upper surface of gear 338 by screw 356 for bodily rotation thereby. Said cam is provided on its peripheral edge with the cam rise portion 358 which is provided with the additional cam rise portion 360. Said rise portion 358 cooperates with a normally closed switch 361, here shown as a micro-switch, although other types of switches may be used, by engaging a roller 362 carried by the operating part 363 thereof, said switch being mounted on bottom wall 104. Rise portion 360 cooperates with a normally closed switch 364, here shown as a micro-switch, although other types of switches may be used, by engaging a roller 365 carried by the operating part 366 thereof, said switch being mounted on bottom wall 104 in position to be operated after switch 361, as hereinafter fully described. Viewing Fig. 13, it will be understood that worm 296 drives gear 312 in a counter-clockwise direction whereby shaft 310 is driven in a counter-clockwise direction thereby rotating gear 318 in a counter-clockwise direction, the latter driving gear 338 and cam 354 in a clockwise direction, all as indicated by the arrows A and B in said figure. An additional cam 367, the function of which is hereinafter described, is also pressed onto collar 346 and overlies cam 354 being secured to the upper surface of the latter by the aforementioned screw 356.

Gear 338 is provided with an integral, upwardly extending, cylindrical projection 368 which is offset from the center thereof and which is provided with a reduced cylindrical portion 369 at the free end thereof, said projection constituting a rack-turning member. Said projection extends through an aperture 370 formed in cam 354 and a slot 371 formed in cam 367. It will be noted from Fig. 14 that gear 338 is positioned below plate 14 of rack 10 so that cylindrical portion 369 can enter the inwardly extending slots 372 (Figs. 2, 13) in the periphery of plate 14, said slots being wider at the open end 373 thereof. Said slots 372 are disposed in equi-spaced relation completely around said plate. It will be understood that as gear 338 is rotated, portion 369 of member 368 enters portion 373 of one of the slots 372, being carried into the slot by the rotation of the gear and then being withdrawn by the continuous rotation of the gear after it reaches a point of maximum penetration into the slot, as is well understood, to rotate plate 14 in a counter-clockwise direction, viewing Figure 13 and as indicated by arrow C thereon, thereby rotating the rack. It will be understood that the rack is rotated in an intermittent manner by gear 338 and member 368, the rack being stationary for a predetermined time interval, as hereinafter described in detail, during which period a receptacle is charged by funnel 32 and the rack rotating one step after said receptacle is charged to position the succeeding receptacle at the charging station. It will be apparent that the quantity of liquid or other material supplied to each receptacle will be determined by the period of time during which each receptacle is at the charging station.

Figure 14:
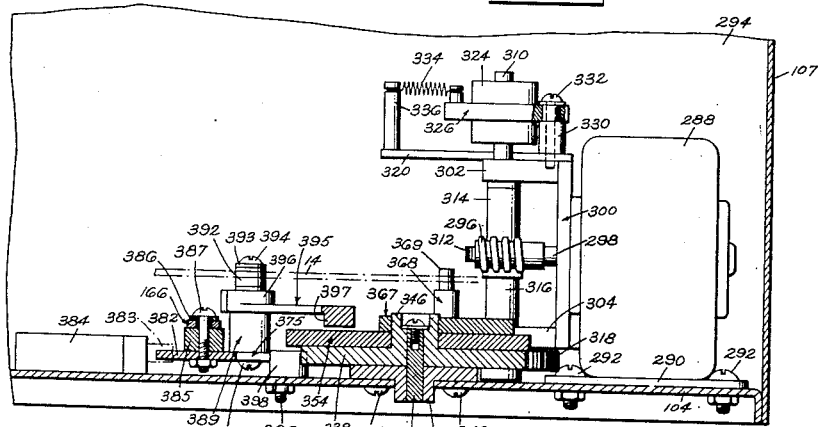
Fig. 14 is a sectional view on the line 14—14 of Fig. 13.
Figure 15:
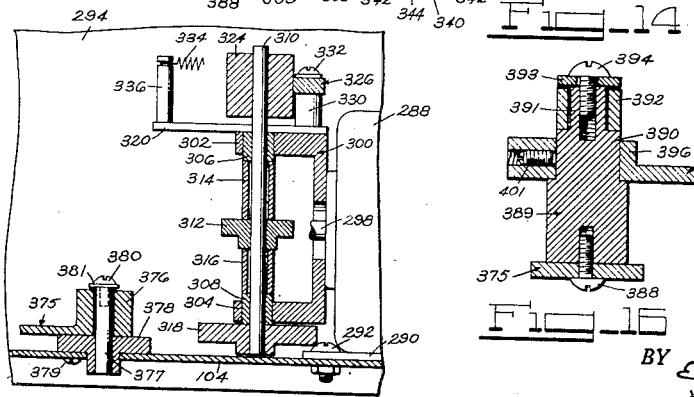
Fig. 15 is a sectional view on the line 15—15 of Fig. 13.

A mechanism 374 is provided for releasably holding rack 10 in stationary position, when the rack turning member 368 is disengaged from the rack, and for actuating a switch which together with switch 361 and a timer-operated switch controls the operation of motor 288. Mechanism 374 comprises the member 375 provided at one end thereof with a hub portion 376 mounted for pivotal movement about a stationary shaft 377 carried by the flanged support 378 secured to bottom wall 104 by screws 379. The screw 380 and washer 381 disposed on shaft 377 retains hub 376 in position on support 378 and prevents the vertical displacement thereof. At its other end, member 375 is provided with a laterally offset portion 382 adapted to operate the actuating member 383 of a micro-switch 384, as will presently appear. A spacing member 385 is mounted on portion 382 and carries the end of link 166 remote from lever 156, said link being retained for pivotal movement thereon by washer 386 and bolt 387 which secure member 385 on portion 382. Intermediate the ends of member 375, there is mounted thereon, as by screw 388, a cylindrical post 389 having a reduced central portion 390 and a further reduced end portion 391. A detent in the form of roller 392 is mounted on said reduced end portion being retained thereon by washer 393 and screw 394. It will be noted, as illustrated in Fig. 14, that rack plate 14 is in a plane elevated above every part of mechanism 374 except detent 392 which is engageable in flaring portion 373 of slots 372. An elongated member 395 provided with a collar 396, at one end thereof, and with a depending portion 397, at the other end thereof, is adjustably mounted on reduced portion 390, collar 396 being rotatably adjustable thereon by set-screw 401. Portion 397 is positioned to be engaged by cam 367 for pivoting member 375 in a clockwise direction, viewing Fig. 13, about post 377. A detent 398 is eccentrically mounted on wall 104 by screw 399 for limiting the counter-clockwise rotation of member 375, said detent being adjustable on said screw for controlling the extent of said counter-clockwise movement.

It will be apparent that when control knob 116 is operated to cam link arm 134, link arm 166 will be carried to a retracted position thereby pivoting member 375 about shaft 377 to carry detent 392 beyond the periphery of rack plate 14, said rack now being freely manually rotatable in either direction, provided member 368 is also beyond the periphery of plate 14, for positioning the rack to fill a predetermined number of receptacles, as previously described. When link 166 is in its normal operating position, lever 156 being in the position illustrated in Fig. 5, spring 214 biases link 166 so that member 375 is biased into engagement with detent 398 and detent 392 is biased into slot portions 373, as illustrated in Fig. 13, during those intervals when said latter detent is not riding on the arcuate peripheral portions of plate 14. It will also be apparent that when cam 367 engages portion 397 of member 395, the latter is carried to a retracted position causing member 375 to pivot in a clockwise direction thereby carrying detent 392 out of the slot to ride on said arcuate peripheral portions of plate 14 as the rack turns. Said movement of member 375 carries link 166 to its retracted position, it being understood, that for said movement, guide 158 and slot 162 constitute a lost motion mechanism so that lever 156 is not affected thereby and remains in its normal operating position illustrated in Fig. 5. When cam 367 disengages portion 397, spring 214 returns link 166 to the operating position illustrated in Fig. 5, thereby returning mechanism 374 to the position illustrated in Fig. 13 wherein detent 392 is engaged in a slot of plate 14 to lock rack 10 in its liquid filling position. It will also be apparent from Fig. 13 that when detent 392 is in a slot portion 373, end portion 382 of member 374 has been rotated in a counter-clockwise direction to engage the external operating member 383 of switch 384 for operating the latter.

It is apparent from the above description that when the rate of flow of liquid into the receptacles is adjusted so that said rate of flow is uniformly constant, the quantity of liquid which is supplied to each receptacle is determined by the length of time during which that particular receptacle is held stationary under the liquid outlet of funnel 32 or of control unit 400, depending upon whether or not the latter is being used, and this length of time is the same as the duration of the period during which the rack is stationary, that is, the length of time between two successive operations of motor 288.

This length of time may be predetermined by any suitable timing device. Provision is made herein for selective operation under the control of a timer which operates at predetermined time intervals, or under the control of a timing device which operates as a drop counter. For convenience of description, the various components associated with operation under the first mentioned timing device have been designated collectively as the main control unit 562 and the components associated with the drop counter have been designated as the auxiliary control unit 592. In the present construction of the apparatus, the elements of the main control unit are disposed within housing 24 and the elements of the auxiliary control unit are removably connected thereto through a suitable terminal connector arrangement.

Figure 31:
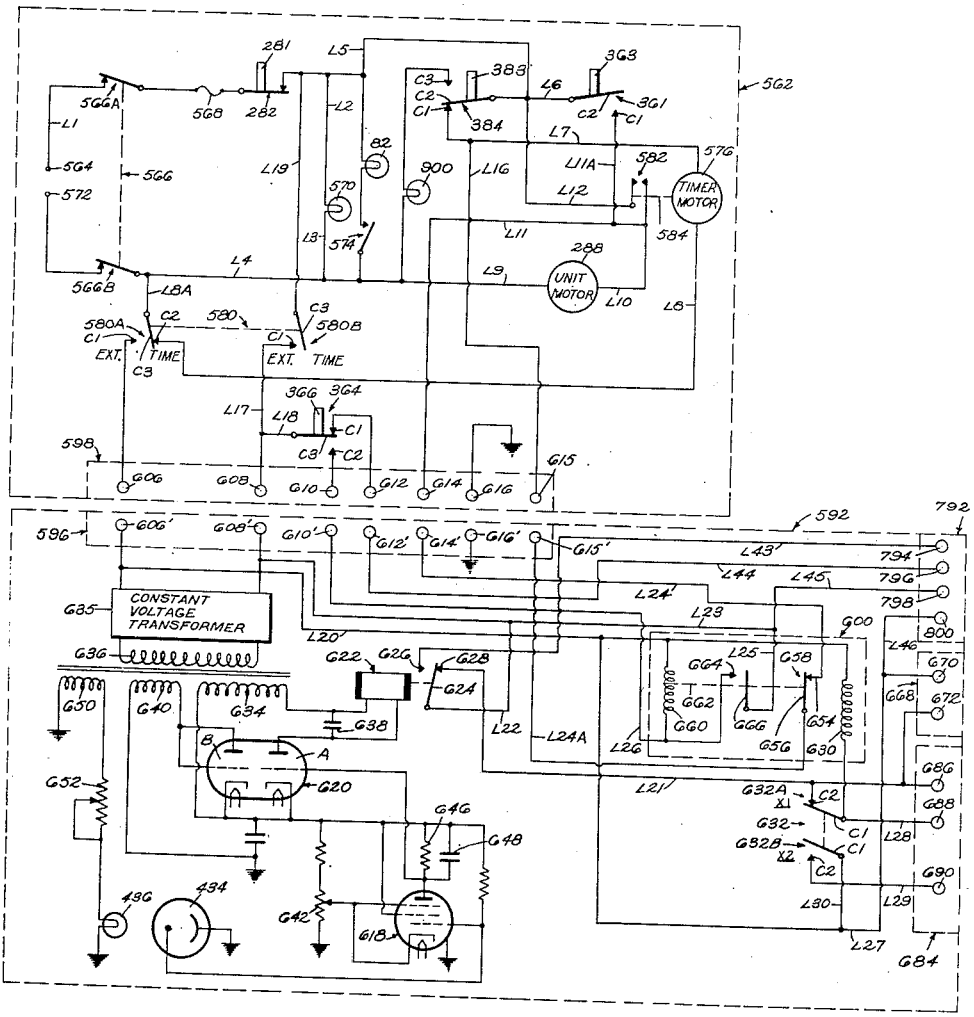
Fig. 31 is a circuit diagram of the electrical devices of the apparatus.

A wiring diagram of the equipment is illustrated in Fig. 31. Referring now to the main control unit 562, from power input terminal 564, which connects to a suitable power source, wire L1 is connected to section 566A of the main manually controlled switch 566, mounted on housing 24, and extends through fuse 568 to one contact of the normally closed automatic shut-off switch 282, here shown as a micro-switch, although other types of switches may be used. From switch 282, a wire L2 is connected to the pilot light 570 on housing wall 77 and a wire L3 runs from said pilot light to a lead L4 which runs through section 566B of switch 566 to terminal 572 which connects to the power source. Said switch sections 566A and 566B are ganged for concomitant operation. The light 82 and a light switch 574 therefor are connected in parallel with pilot light 570. From switch 282, a wire L5 extends to a wire L6 which is connected to the movable contact C2 of the switch 384, here shown as a micro-switch, it being understood that other types of switches may be used in place of a micro-switch. Contact C1 of switch 384 is normally engaged by movable contact C2 thereof. Movable contact C2 of switch 384 is connected by said wire L6 to the movable contact C2 of rack drive cam switch 361, here shown as a micro-switch, it being understood that other switch types may be used. From contact C1 of switch 384, a wire L7 connects to the electric clock motor of a timing device or counter 576, the controls 578 of which are mounted on the upper wall 47 of the housing. The timing device or counter may be of any suitable type, and is readily available on the market, and since it is not in itself part of the present invention, it is not herein described specifically or further illustrated, but certain parts thereof are hereinafter referred to in explaining the operation of the apparatus. The counter or timing device utilized in the present apparatus, as actually constructed and operated, is an automatic reset counter of a well known type wherein the manual control and indicator 578 may be adjusted to operate the timer motor for a predetermined time interval, the control during its movement to zero position indicating the elapsed period of operation during the operating-cycle of the motor and automatically resetting itself at the end of each operating cycle. From the timer 576 a wire L8 is connected to the stationary contact C2 of section 580A of a double-pole double-throw switch 580 located on housing panel 77. The movable contact C3 of switch section 580A is connected through wire L8A to wire L4 which is connected through the manually operated switch section 566B to terminal 572. It will be apparent that when movable contact C3 of switch section 580A engages contact C2 thereof, the timer motor 576 is connected to the power input terminals through the described circuit.

The rack-drive motor 288 is connected to lead L4 by wire L9, and by wires L10, L11 and L11A to the stationary contact C1 of switch 361. Motor 288 is also connected by wire L10 to one contact of the timer controlled switch 582, the other contact of which is connected by wire L12 to wire L6. It will be understood that switch 582 is operated by the mechanism of the timer as indicated diagrammatically at 584, the contacts of said switch being closed by the timer motor at the end of the predetermined time setting and then opened again when the timer is reset by an interruption of power to the timer motor.

The operation of the apparatus under control of the timer device 576 will now be described with reference to the wiring diagram. Under this type of operation, the control unit 400 is not used and funnel 32 is mounted directly on stub 46, the liquid flowing directly from funnel outlet 34 into the receptacles. The control knob 116 having been operated, as described, to permit the manual adjustment of the rack and of bracket 44, and assuming that the latter has been positioned, so that outlet 34, which may be of the dropper type 34A, is in registry with one of the receptacles in the innermost row, which we shall assume is the first receptacle positioned rearwardly of rack pin 21, as described above, said control knob having been returned to its initial position in which the rack plate 14 is engaged by detent 392, the timer 576 having been set as desired, and switch 580 having been thrown to Time position, switch 566 is closed. This connects the timer motor to the power supply as follows: from terminal 564 over wire L1 through the normally closed switch 282, through wires L5 and L6, through the contacts C1 and C2 of switch 384 which are engaged when detent 392 is positioned in the rack slot, as illustrated in Fig. 13, over wire L7 to the motor of timer 576, and from the timer motor by way of wire L8, engaged contacts C2 and C3 of switch 580A, and wires L8A and L4 to terminal 572. As the timer switch 582 remains open according to the setting of timing control 578 and as said switch controls the circuit of rack-drive motor 288, the latter does not operate and rack 10 remains stationary until said switch is closed at which time the circuit of motor 288 is completed as follows: from terminal 564, through switches 566A and 282, wires L5 and L12, switch 582 (now closed) and wire L10 to one side of motor 288 and from the other side of the motor by wires L9 and L4 to input terminal 572. This completed circuit causes the motor to operate thereby causing worm 296 to drive gear 312 for driving shaft 310, which rotates gear 318 to drive gear 338 whereby part 369 enters a slot 372 and rotates the rack in the direction of the arrow C thereon in Fig. 13. Very shortly after the rack begins to turn, edge 358A of rise 358 of cam 354 engages roller 362 of the switch operating member 363 of the rack-drive switch 361 and moves contact C2 into engagement with contact C1, thus completing a parallel circuit from the motor 288 to power terminal 564 through wires L10, L11a, closed switch 361, wires L6 and L5, and switches 282 and 566A. In the meantime, since the power is still connected to motor 288, due to the turning of the rack, detent 392 is caused to move out of slot portion 373 to the peripheral edge portion of the rack between successive slots 372 and thereby carries portion 382 of member 375 out of operative engagement with the operating member 383 of switch 384 to disengage contact C1 and C2 thereof, thus breaking the circuit from power terminal 564 to timer motor 576 to open switch 582. Since switch 361 parallels switch 582, the unit motor has uninterrupted power to complete its operational cycle through closed switch 361 when switch 582 is open. More particularly, this circuit is completed by wires L10, L11 and L11A to engaged contacts C1—C2 of switch 361, and wire L6, which is connected to wire L5. When contact C2 of switch 384 disengages contact C1 and engages contact C3 thereof, a circuit is completed between one side of pilot light 990 and power terminal 564, the other side thereof being connected to power terminal 572 through wire L4, whereupon the light is energized to indicate that detent 392 has moved out of engagement in a rack slot. The rack continues to rotate until detent 392 enters the next notch or slot portion 373 at which time the rack comes to rest and operating member 383 of switch 384 is engaged by part 382 of member 375 whereby pilot light 900 is de-energized and the circuit of the timer motor 576 is again completed and the timer again operates for the next charging interval. Edge 358B of rise 358 of cam 354 disengages operating member 363 of switch 361 when part 369 is positioned approximately between adjacent slots 373, as in Fig. 13, thereby opening switch 361 to interrupt the circuit of motor 288. Brake shoe 326 which is biased by spring 334 into frictional engagement with brake drum 324 provides a braking action sufficient to oppose the inertia of the rack and bring it to a stop after detent 392 enters the notch or slotted portion 373 of the rack at the end of the step motion of the rack, as just described. Due both to a gear ratio of 2:1 between gears 338 and 318, and to the fact that the inertia of the movable motor-operated parts which actuate cam 354 is such in relation to the inherent friction and to friction by the brake shoe against the brake drum, it will be understood that said cam and the inter-geared motor operated parts return ot the correct starting position so that the cycle of operation is repeated each time under the control of the timer. It will be noted that during the rotation of cam 354 on gear 338, cam rise 360, which has no effect upon switch 361, engages roller 365 of switch 364 to operate the actuating part 366 thereof for disengaging the movable contact C3 from its normal engagement with contact C1. However, since switch section 580B, which is ganged to switch section 580A, is in Time position, the movable contact C3 of switch 580B is disengaged from contact C1 thereof which is connected by wires L17 and L18 to contact C3 of switch 364, whereby the latter is out of the circuit to the power input terminals and does not affect the operation of the mechanism.

It will be noted that at the completion of the described operating cycle, switches 384 and 361 are in the originally described circuit condition to connect the timer to the power source and that the rack has moved one step in a counter-clockwise direction to position the next receptacle in the liquid filling station when the timer motor is again connected to the power supply.

When it is desired to move the rack after each receptacle has received a predetermined number of drops, rather than after a predetermined rest interval, as described above, the control unit 400 is mounted on stud 46 and funnel 32 is mounted on support bracket 44, as previously described. Cable 586 from control unit 400 is provided with a plug 588 which engages in terminal receptacle 590 on the auxiliary control unit 592 (Fig. 36), the latter being connected by cable 594 provided with a plug 596 which engages in terminal receptacle 598 on housing 24. The timing device 600 used with control unit 400 has a suitably calibrated dial 602 and a time-adjusting knob 604 mounted on the panel of the auxiliary control unit. The timing device or counter 600 may be of any suitable type, and since it is not in itself part of the present invention it is not herein described specifically, but certain parts thereof are hereinafter referred to in explaining the operation of the apparatus. The counter or timing device 600 utilized in the apparatus as actually constructed and operated is an instantaneous reset counter of the type described in U. S. Patent No. 2,329,447 and was supplied by Eagle Signal Corporation, Moline, Illinois. When switch 580 is in Ext. position, and switch 364 is engaged as hereinafter described, a clutch coil, i. e., a coil of an electro-magnetically operated clutch, is engaged and impulses transmitted to a count or ratchet-operating coil of an electromagnet are effective to operate the rachet, and when the clutch coil is de-energized, the counter is automatically reset to its starting position. The count coil and the ratchet operated thereby take the place of the synchronous or clock motor 22 of said patent for operating the timer shaft 25 of said patent, and timer 600 takes the place of timer 576, and the switch connections in the circuit are modified as required, as indicated in Fig. 31, as will be readily apparent. The clutch coil and count coil and the switching connections are schematically shown in Fig. 31 and will be presently more particularly referred to in the description of the operation of the apparatus.

As show in Figure 31, the main control unit 562 is provided with the previously mentioned terminal receptacle 598 having a terminal 606 connected to contact C1 of switch section 580A, a terminal 608 connected to the junction of wires L17 and L18, a terminal 610 connected to stationary contact C2 of switch 364, a terminal 612 connected to stationary contact C1 of switch 364, a terminal 614 connected to lead L11, a terminal 616 which is grounded and a terminal 615 connected to wire L16 which is connected to contact C1 of switch 384. The auxiliary control unit plug 596 has the terminals 606', 608', 610', 612', 614', 616' and 615', engageable with the respective terminals of receptacle 598. To tie the auxiliary control unit 592 into the circuit of the main control unit 562, switch 580 is thrown to the Ext. position. The photo-electric cell 434 of control unit 400 is connected to the electronic tube 618 which as here shown, is a 6SJ7 tube, in an electronic-relay circuit. This tube is biased so that it is normally non-conducting but becomes conducting under the control of photo-electric cell 434 each time a drop of liquid passes between said cell and the exciter lamp 436 and cuts off the light from said lamp to said cell. An electronic tube 620, here shown as a 6SN7 tube, has an electronic discharge system therein connected to the winding of magnetic relay 622 and operable under the control of tube 618. The section of tube 620 which is connected to relay 622 and tube 618 is indicated at A. This section is normally conducting and energizes the winding of relay 622 so that the movable contact 624 and stationary contact 626 of said relay are normally engaged. When a pulse is received by tube 618, section A of tube 620 becomes non-conducting and as a result the winding of relay 622 is de-energized and contacts 624 and 628 of said relay close so that a pulse is sent to the count or ratchet-operating coil 630 of the timing device 600 when the counter multiplier switch 632 is in position X1, as hereinafter described. Power for the relay circuit is provided by the transformer secondary winding 634, the primary winding 636 of said transformer being connected to the alternating current input terminals 564 and 572 of the main control unit when switch 580 is in Ext. position. Specifically, primary winding 636 is connected through a constant voltage transformer, indicated diagrammatically at 635, to terminals 606', and 608', on plug 596 which engage with terminals 606 and 608, respectively, of receptacle 598. Terminal 606 is connected to power terminal 572 through engaged contacts C1—C3 of switch 580A and leads L8A and L4. Terminal 608 is connected to power terminal 564 through wire L17, engaged contacts C1—C3 of switch 580B, wire L19, normally closed switch 282 and the closed manually operated switch 566. Tube 620 conducts current only during the positive half of the alternating current cycle, so that a pulsating current flows through the relay circuit. Accordingly, a condenser 638 is provided to smooth the voltage across the winding of relay 622 so as to prevent it from following the frequency of the current through the tube. The section B of tube 620 constitutes a half wave rectifier for the current supplied by the transformer secondary winding 640. The sensitivity control provided by the adjustable resistance 642 is adjusted, by the knob 644 on the control panel of the auxiliary control unit 592, so that the effect of the light from lamp 436 on photo-electric cell 434 causes the grid of tube 618 to be negative with respect to the cathode, whereby plate current through said tube is cut off as a result of this negative bias. The grid-cathode of section A of tube 620 is connected across the resistor 646 in the plate circuit of tube 618. The voltage drop across this resistor acts as a bias voltage to the grid of section A of tube 620, but since voltage across this resistor is normally zero the flow of plate current in section A of tube 620 takes place so that the winding of relay 622 is normally energized, as hereinbefore indicated. When light on the photo-electric cell 434 is interrupted, upon the passage of a drop of liquid across the light beam from lamp 436 to said photo-electric cell, the negative bias on the grid of the tube 618 is decreased and the plate circuit of said tube conducts current whereby the voltage drop across resistance 646 produces a negative bias across the grid-cathode of section A of tube 620, interrupting the flow of current in the plate circuit of said tube and thus de-energizing relay 622 so that contacts 624, 628 close and complete a circuit through the count or ratchet operating coil 630. Specifically, one end of the coil 630 is connected by wire L20 to terminal 606' of plug 596 which is connected, as previously described, to power terminal 572. The other end of coil 630 is connected to the movable contact C1 of section 632A of the double-pole, double-throw counter multiplier switch 632, and in position X1, said contact C1 is engaged with contact C2 which is connected to relay contact 628 by wire L21. When the relay is de-energized, and contact 628 is engaged by relay contact 624, the count coil is also connected to power terminal 564, through contact 624 which is connected to receptacle terminal 608 through leads L22 and L23 and plug terminal 608', said receptacle terminal being connected to power terminal 564, as previously described, thereby completing the circuit for energizing count coil 630. The condenser 648 across resistance 646 charges when tube 618 conducts current, and after said tube is cut off the charge across condenser 648 leaks off across resistor 646 and thereby maintains the grid of section A of tube 620 negatively biased and the circuit of the winding of relay 622 deenergized for a short period of time after light is restored to the photoelectric cell 434. This circuit provides a quick charge path and a slow discharge path for the condenser 648 and in this way a light interruption of short duration, when a drop of liquid passes between the photo-electric cell and the exciter lamp 436 is in effect prolonged for a sufficient length of time to enable the relay 622 to operate. The transformer secondary 650 provides a source of current for heating the filaments of tubes 618 and 620 and for energizing exciter lamp 436, a variable resistor 652 being provided for adjusting the intensity of said lamp.

Motor 288 is connected directly to power terminal 572 through wires L9 and L4, and to power terminal 564 through wires L10, L11, engaged terminals 614 and 614', wire L24, through engaged stationary and movable contacts, 654 and 656, respectively, of switch 658 through wire L24A connected to terminal 615' of plug 596, which is connected to power terminal 564, through wire L16 and engaged contacts C1—C2 of switch 384, as previously described. Contact 656 is engaged with the companion contact 654 of switch 658 when the solenoid or clutch coil 660 of the timing device 600 is de-energized, and conversely, when said clutch coil is energized, the armature 662 which is then attracted by said clutch coil is operable to disengage contact 656 from contact 654 for opening switch 658, thus interrupting the supply of current to motor 288. It will be noted that one terminal of clutch coil 660 is connected to wire L20 to which one terminal of count coil 630 is also connected, and, as previously described, said wire is connected through the engaged terminals 606' and 606 to power terminal 572. The other terminal of the clutch coil 660 is connected by wire L26 to plug terminal 610' which is engaged with receptacle terminal 610, the latter being connected to fixed contact C2 of switch 364, said contact being engaged by movable contact C3 of said switch upon the operation of the operating element 366 thereof by rise 360 of cam 354, as hereinafter described in detail, said movable contact being connected through wires L18 and L17, the engaged contacts C1—C3 of switch 580B, wire L19, and switches 282 and 566 to power terminal 564. The other end of the count or ratchet operating coil 630 is connected through switch 632A to the contact 628 of relay 622 by wire L21, and, as pointed out above, when contact 628 is engaged by contact 624 said other end of coil 630 is connected to power terminal 564 for energizing said coil.

The timing device 600 includes a stationary contact 664 and a companion movable contact 666. These contacts are open when the clutch coil is de-energized and are closed when said clutch coil is energized, contact 666 being then moved to engage contact 664 by armature 662 of said clutch coil 660. It will be noted that contact 664 is connected to one terminal of the clutch coil and that movable contact 666 is connected to wire L23 by wire L25 to complete a holding circuit for said clutch coil, wire L23 being connected to power terminal 564, as previously described.

The operation of the apparatus under the control of the auxiliary control unit 592 will now be described with reference to Fig. 31, it being assumed that the apparatus has been adjusted for operation by the main control unit 562, as previously described, and, in addition that switch 580 is in Ext. position, switch 632 is in X1 position and that the knob 604 of the timing device or counter 600 has been set to determine the quantity of liquid to be supplied to each of said receptacles under the control of the photo-electric relay which is operable under the control of the photo-electric cell 434 in response to the movement of the drops of liquid from the funnel across the beam of light to said cell. When switch 566 is closed, motor 288 is connected to power terminal 572 through wires L9 and L4, and is connected to power terminal 564 through wires L10, L11, engaged terminals 614 and 614', wire L24, engaged contacts 654 and 656 of switch 658, wires L24A, engaged terminals 615' and 615, wire L16, engaged contacts C1—C2 of switch 384, wires L6, L5 and switches 282 and 566A, and the completed circuit causes motor 288 to operate thereby causing worm 296 to drive gear 312 for driving shaft 310, which rotates gear 318 to drive gear 338 whereby part 369 enters slot 372 and rotates the rack in the direction of arrow C in Fig. 13. Very shortly after the rack begins to turn, and before switch 384 is opened, edge 358A of rise 358 of cam 354 engages roller 362 of the switch operating member 363 of the rack-drive switch 361 and moves contact C2 into engagement with contact C1 completing a parallel circuit to the motor 288. The motor being connected to the power source through the engaged contacts of switch 361, as previously described, continues to operate whereby cam 354 continues to turn until cam rise 360 momentarily engages roller 365 of the switch operating member 366 of the count start switch 364, and moves contact C3 thereof out of engagement with contact C1 and into engagement with contact C2 thereof. This completes the circuit through clutch coil 660 to the power input source so that said coil is energized and opens the switch 658 to interrupt the circuit of motor 288 through the auxiliary control unit 592, at the same time closing the contacts 664 and 666 to provide a holding circuit for the clutch coil 660 independently of switch 364 which has been disengaged by cam rise 360 as a result of the continued movement of the cam 354 due to the circuit of motor 288 in main control unit 562 remaining closed through switch 361 until operating part 362 of said switch is disengaged from cam portion 358 at 358B, the parts being disposed as in Fig. 13. Motor 288 then stops and remains stationary until the count coil 630 has been energized a number of times corresponding to the setting of the knob 604 of the counter or timing device 600. After the predetermined number of pulses have been supplied to counter coil 630 under the control of relay 622, as described above, solenoid or clutch coil 660 is de-energized, contacts 664 and 666 being opened, and switch 658 is closed and the timer is automatically reset for the next operation. When contacts 664 and 666 are opened and clutch coil 660 is therefore de-energized, switch 658 is closed, thus completing the circuit through motor 288 for operating gear 338 through one revolution and, as illustrated in Fig. 13, it will be noted that after the count start switch 364 is actuated by cam rise 360 and the rack has stopped moving, part 369 has already left the rack 10 so that there is no delay at the start of the next cycle. It will be understood that the time of each rack movement under the control of the photo-electric relay is less than the time between successive drops through outlet 402 of device 490, so that as soon as the last drop of one series passes into its receptacle, the next receptacle is in position to receive the first drop of the next series. The operating cycle is repeated for each receptacle to be supplied with the liquid until the automatic shutoff switch 282 is opened. The manner in which pin 21 operates the pawl and ratchet devices to cause the lateral movement of the liquid feed mechanism has been described above. After tooth T5 has cleared the pawl, and the ratchet plate is in its fully retracted position, as in Fig. 9, roller 280 carried thereby engages the operating member 281 of the normally closed switch 282 to open said switch and stop the apparatus, it being apparent that this takes place when the last receptacle has been charged.

Figure 32:
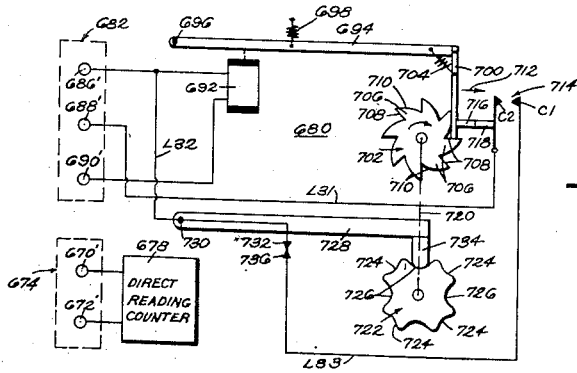
Fig. 32 is a circuit diagram of a counter-multiplier circuit used with the apparatus and of a connection for a direct reading counter.

Provision is made for indicating the total number of drops distributed to the various receptacles through control unit 400 at any specific time. In this connection it will be noted that the auxiliary control unit 592 is provided with a terminal receptacle 668 having terminal 670 connected by wire L27 to wire L20, the latter being connected to power terminal 572 through terminal 606' of plug 596, as previously described. Terminal 672 of receptacle 668 is connected to wire L21 which is connected to contact 628 of relay 622. A terminal plug 674 is provided with terminals 670' and 672' which are engageable with said terminals 670 and 672, respectively. A direct reading counter 678, illustrated diagrammatically in Fig. 32, is connected across terminals 670' and 672'. Counter 678 may be any type of counter which operates in response to electrical pulses. Many such counters are commercially available, one such type being the Veeder counter. When plug 674 is inserted into receptacle 668, and with the counter multiplier switch 632 in position X1, it is apparent that each time that relay 622 is de-energized by the passage of a drop, as previously explained, to pulse the timer coil 630, the direct-reading counter 678 will simultaneously be energized. Specifically, one end of the counter 678 being connected to power terminal 572 through terminals 670', 670, wire L27, wire L20, terminals 606' and 606, switch 580A and wires L8A and L4, the other end of the counter is connected to power terminal 564 each time that relay 622 is de-energized, as follows: through terminals 672' and 672, wire L21, engaged contacts 628 and 624 of relay 622, wires L22, L23, terminals 608' and 608, wire L17, engaged contacts C1—C3 of switch 580B, wire L19, switches 282 and 566A, and wire L1 to power terminals 564. Therefore, it is apparent that each drop results in a pulse across counter 678, said pulses being recorded on the counter.

Provision is also made for expanding the range of operation of timer 600, for example, by having the timer coil 630 pulsed by every second drop that passes into a receptacle, instead of by each and every drop. For this purpose, there is provided the multiplier mechanism 680, Fig. 32, which is provided with the terminal plug 682 which engages with the terminal receptacle 684 on the auxiliary control unit 592. Said receptacle 684 is provided with the terminal 686 connected to wire L21, the terminal 688 connected by wire L28 to the movable contact C1 of switch 632A and to the count coil 630, and the terminal 690 which is connected by wire L29 to the stationary contact C2 of switch 632B which with switch 632A constitutes the aforementioned double-pole, double-throw switch 632, the movable contact C1 of switch 632B being connected by wire L30 to wire L27. Terminals 686' and 690', which engage with terminals 686 and 690, respectively, are connected to the relay 692 which, when energized, attracts armature 694 to pivot the latter about pivot 696 in opposition to the bias of spring 698. At its free end, armature 694 carries a pivoted pawl 700 which operates a ratchet 702 for rotating the latter, in step-wise movements, in the direction of the arrow thereon. A spring 704 connected between the pawl 700 and the armature 694 biases the pawl into engagement with each succeeding ratchet tooth 706 after having urged the prior ratchet tooth in the direction of rotation of the ratchet. It will be noted that each tooth 706 has a surface portion 708 adapted for engagement by the free end of the pawl, and an opposing arcuate surface portion 710 which moves the pawl in the direction of arrow 712 as the free end thereof bears against portion 708 of the prior tooth in the direction of rotation of ratchet 702. At the end of its movement toward relay 692, armature 694 is retracted by spring 698 to retract pawl 700, spring 704 returning the pawl to engage the following tooth on the next movement of the armature. A normally open switch 714 having a stationary contact C1 and a movable contact C2 is disposed for operation by the pawl during said outward movement thereof. For this purpose the pawl is provided with an actuating part 716 which engages the externally disposed operating element 718 carried by contact C2 for closing the contacts of switch 714 each time that pawl 700 operates ratchet 702. Contact C2 is connected by wire L31 to terminal 688' of plug 682 which engages with terminal 688 of receptacle 684. Ratchet 702 is mounted on a shaft, indicated schematically at 720, on which there is also mounted a cam 722. Said cam is provided with a plurality of equally spaced cam rise portions 724 and with the cam troughs 726 between adjacent rise portions thereof. A flexible member 728, pivoted at 730 and provided with a contact 732 and with a cam follower part 734, is connected by wire L32 to terminal 686'. A contact 736, which cooperates with contact 732, is connected by wire L33 to the stationary contact C1 of the normally open switch 714.

With plug 682 engaged in receptacle 684, and with the multiplier switch 632 in position X2 wherein contacts C1 and C2 of switch section 632A are disengaged, and contacts C1 and C2 of switch section 632B are in engagement, it will be noted that the direct reading counter 678 is still connected to contact 628 of relay 622 and operates, as previously described, to record each drop. However, the circuit between said contact 628 and timer coil 630 is interrupted by the disengaged contacts of switch 632A. It will be noted that one end of relay 692 is now connected directly to power terminal 572 through engaged terminals 690' and 690, wire L29, the engaged contacts of switch 632B, wires L30, L27, L20, engaged terminals 606' and 606, contacts C1—C3 of switch 580A, and wires L8A and L4. The other end of relay 692 is connected through terminals 686' and 686 to wire L21 which is connected to power terminal 564 each time that relay 622 is de-energized by the passage of a drop between exciter lamp 436 and photo-cell 434, as previously described. Upon the energization of relay 692 by the passage of a drop, armature 694 is attracted to relay 692 and pawl 700 rotates ratchet 702 thereby rotating cam 722 whereby follower 734 engages either in a trough 726 or rides on a rise 724, depending upon its position immediately prior to the energization of relay 692. With the follower disposed in a cam trough, contacts 732 and 736 are engaged, said contacts being disengaged when the follower rides on a rise portion of cam 722. Therefore, it will be apparent that switch 714 is closed upon each energization of relay 692 by the passage of a drop, as previously described, but that contacts 732 and 736 engage only on every second energization of relay 692 or upon the passage of every other drop. However, the circuit to the counter coil 630 is completed only when contacts 732 and 736 engage upon the passage of alternate drops. In said latter condition of the multiplier 680, the timer coil 630 is energized since it is connected to power terminal 564 as follows: through wire L28, terminals 688 and 688', wire L31, the engaged contacts of switch 714, wire L33, engaged contacts 732 and 736, wire L32, terminals 686' and 686, wire L21, engaged contacts 628 and 624 of relay 622, wires L22 and L23, terminals 608' and 608, to terminal 564, as previously described, the other end of the timer coil 630 being at all times connected to power terminal 572, in the Ext. position of switch 580A, as previously described. It will be noted that after the passage of said second drop, contacts 732 and 736 remain engaged but the de-energization of relay 692 interrupts the circuit by opening switch 714. On the succeeding drop, relay 692 is again energized, and cam 722 is moved one step whereby the follower 734 rides on the succeeding cam rise 724 whereby member 728 is pivoted at 730 to disengage contacts 732 and 736, thereby breaking the circuit between the timer coil 630 and power terminal 564 despite the closing of switch 714 so that said coil is not energized at the passage of said succeeding drop. On the next succeeding drop, relay 692 is again energized and cam 722 is turned one step to position follower 734 in the following trough 726 to close contacts 732 and 736 to energize the timer coil. It will be apparent that, in this manner, the timer coil is energized by every second drop so that it takes twice the number of drops to fully energize said coil to reset the timer 600 for moving rack 10 one step, as previously described. It will be understood, moreover, that by rearranging the rise portions and trough portions of cam 722, the timer coil may be energized at any other desired drop interval.

Provision is also made for the operation of the apparatus under the control of automatic dispensing equipment, both with, and without, the use of the auxiliary control unit 592. Where the latter is not used, the pump control unit 738, illustrated in Fig. 33, may be used. Pump control unit 738 is provided with a timing device or counter 740 which may be of the same type as the previously described counter 600 in the auxiliary control unit 592. It will be understood that timer 740 is provided with a suitably calibrated dial and a time adjusting knob similar to dial 602 and knob 604 of timer 600. Instead of being pulsed by the interruption of light transmitted to a photo-electric cell, the count or ratchet-operating coil of timer 740 is pulsed during each cycle of operation of a dispensing pump while the clutch coil of said timer is energized, and when the clutch coil is de-energized, the counter is automatically reset to its starting position, in the same manner as counter 600. In this manner each receptacle may receive a predetermined amount of material during each cycle of operation of the dispensing pump 741. It will be understood that the container 50 (Fig. 1) may be supplied directly by the dispensing pump 741 or may be omitted, said pump feeding the material directly from a supply source (not illustrated) into the column 54, or, under certain uses of the apparatus, the pump may feed the material directly into the funnel 32 or directly into the receptacles T.

As shown in Fig. 33, the pump control unit 738 is provided with a terminal plug 742 having the terminals 744, 746, 748 and 750 which engage with terminals 606, 608, 610 and 614, respectively, of receptacle 598 of the main control unit 562. Clutch coil 752 of timer 740 is connected, at one end, to wire L34 which is connected to terminal 744 through a switch 754. The other end of said clutch coil is connected to wire L35 which is connected to terminal 748. The fixed contact 756 is also connected to wire L35, its cooperating movable contact 758, which is operated by the armature, indicated at 760, of the clutch coil being connected through the wire L36 to the movable contact 762 of switch 764, the fixed contact 766 thereof being connected to wire L37 which is connected to terminal 746. The movable contact 768 of switch 770 is also operated by armature 760 and is connected to wire L36, the fixed contact 772 of said switch being connected to wire L40, which is also connected to terminal 750. The timer coil 774 is connected at one end to the wire L34, and, at its other end, it is connected by wire L38 to the stationary contact C1 of a selector switch 776, having a movable contact C2 which is ganged with the movable contact 762 of switch 764. The stationary contact C3 of switch 776 is connected by wire L39 to wire L40, the movable contact C2, thereof being connected to the stationary contact 778 of a switch 780 having a movable contact 782 provided with the operating part 784 which, when operated by a cam 786, moves contact 782 into engagement with contact 778, said movable contact 782 being connected to wire L37. The motor 788 is connected by wire L41 to wire L34, and by wire L42 to wire L37, the cam 786 being carried by the shaft 790, of said motor, said cam rotating in the direction of the arrow thereon, said shaft also operates the pump 741.

The pump control unit 738 may be operated either with, or without, the timer 740. To operate the pump control unit directly, the rack is manually adjusted to position the first receptacle to be filled in material receiving position, as previously described, switch 580 is thrown to Ext. position, to take timer 576 out of the circuit, as previously described, and ganged switches 764 and 776 are thrown to the Direct position in which switch 764 is open and in which contacts C2 and C3 of switch 776 are engaged. When start switch 754 is closed, it will be noted that the rack 10 will remain stationary since motor 288, although connected to power terminal 572 through wires L9 and L4, is not connected to power terminal 564 since the circuit thereto is open at switch 780. This circuit includes wires L10, L11, engaged terminals 614 and 750, wires L40 and L39, engaged contacts C2—C3 of switch 776, the disengaged contacts 778 and 782 of switch 780, wire L37, engaged terminals 746 and 608, wire L17, engaged contacts C1—C3 of switch 580B, to power terminal 564, as previously described. Since pump motor 788 is connected to the power terminals, as follows, through wire L41, engaged terminals 744 and 606, through engaged contacts C1—C3 of switch 580A to power terminal 572; and through wires L42, L37, engaged terminals 746 and 608, wire L17, engaged contacts C1—C3 of switch 580B to power terminal 564, the pump will begin to operate and feed the material to the receptacle in the liquid filling station. At the end of a cycle of operation of the pump motor 788, cam 786 carried by pump shaft 790 engages operating part 784 of switch 780 to close the contacts thereof to complete the circuit between motor 288 and power terminal 564, as previously described, and rack 10 is turned one step to position the next receptacle in the material filling station. It will be understood that cam 786 is so dimensioned as to close said circuit long enough for cam 354 to operate switch 361 to complete one step movement of the rack, as previously described, following which cam 786 disengages part 784 and the motor 288 is left under the control of switch 361, as previously described. It will be apparent that the amount of material in each receptacle will be governed by the capacity of the pump 741, i. e. by the amount pumped in each cycle of operation of pump motor 788, the rack 10 moving one step for each cycle of operation, until the apparatus is automatically shut-off after all the receptacles have been filled, by the opening of switch 232, as previously described.

When it is desired to cause the rack to remain stationary for a predetermined number of operating cycles of pump motor 788, rather than for only one cycle, as previously described, the calibrated dial of timer 740 is preset for a desired number of operating cycles and the ganged switches 764 and 776 are thrown to Count position, in which the contacts of switch 764 are closed and contacts C1 and C2 of switch 776 are engaged. It will be noted that motor 288 is now connected to power terminal 564 through an initiating power circuit comprising engaged terminals 614 and 750 and wire L40, as heretofore described, then through the normally engaged contacts of switch 770 of timer 740, through wire L36, the now closed switch 764, through wire L37, and through engaged terminals 746 and 608, as previously described. Motor 288 begins to turn rack 10 and when the aforementioned cam rise 360 of cam 354 engages operating part 366 of switch 364 to close the contacts C3—C2 thereof, timer clutch coil 752 is connected to the power terminal 564 through wire L35, engaged terminals 748 and 610, engaged contacts C2—C3 of switch 364, wires L18 and L17, engaged contacts C1—C3 of switch 580B and through the main control unit 562, as previously described; the other end of said clutch coil being connected to power terminal 572 through wire L34, switch 754, engaged terminals 744 and 606, and through said main control unit, as previously described. Upon the energization of said clutch coil, its armature 760 opens the contacts of switch 770 to open the initiating power circuit for motor 288, the motor remaining energized under the control of switch 361, as previously described, and contact 758 engages contact 756 to form a holding circuit for said clutch coil through wire L36, the closed switch 764, wire L37, engaged terminals 746 and 608 and through the main control unit 562 to power terminal 564, as previously described. The pump motor 788 being connected to the power terminals, as previously described, is operative, and at the end of each cycle of operation thereof, as described, cam 786 closes switch 780 whereby the timer count coil 774, which has one end at all times connected to the end of the clutch coil 752 which is connected to power terminal 572 through the engaged terminals 744 and 606, as described, is pulsed by the closing of said switch 780 since the other end thereof is thereby momentarily connected to power terminal 564 through wire L38, engaged contacts C1—C2 of switch 776, closed switch 780, wire L37, engaged terminals 746 and 608, and through the main control unit 562, as described, to power terminal 564. After the coil 774 has been pulsed the predetermined number of times, as determined by the setting of timer 740, the clutch coil 752 is de-energized thereby closing the circuit for motor 288 and the rack 10 turns a step, the cycle being started again when cam rise 360 operates part 366 of switch 364, as described. It will be understood that rack 10 moves between the end of the last cycle of pump motor 788 to pulse coil 774 and the beginning of the next cycle of said pump motor, the various components being in the position illustrated in Fig. 13 when the rack is stationary, part 369 having just left the rack slot.

Provision is also made for the use of automatic dispensing equipment when the auxiliary control unit 592 is used in conjunction with the main control unit 562. Said auxiliary control unit is provided with a terminal receptacle 792 having the terminals 794, 796, 798 and 800. Terminal 794 is connected by wire L43 to stationary contact 626 of relay 622. Terminal 796 is connected by wire L44 to terminal 612' of terminal plug 596. Terminal 798 is connected by wire L45 to wire L23, and terminal 800 is connected by wire L46 to wire L27. The pump operating unit 802 (Fig. 34) is provided with a terminal plug 804 having the terminals 806, 808 and 810 which are engageable with terminals 794, 796 and 800, respectively. Terminal 806 is connected by wire L47 to stationary contact C1 of selector switch 812, stationary contact C2, thereof, being connected by wire L48 to terminal 808. Movable contact C3 of said switch 812 is connected by wire L49 to a thermostatically responsive bi-metallic element 814, to the heater 816 therefor and by wire L50 to the movable contact 818 of a switch 820 having a fixed contact 822 connected by wire L51 to one side of a pump motor 824, the other side thereof being connected through start switch 826 to terminal 810. A relay 828 has one end connected by wires L52 and L53 to said switch 826, the other side of the relay being connected by wire L54 to the stationary contact 830 of switch 832 and the contact 834 cooperating with bi-metallic element 814. The movable contact 836 of switch 832 is connected by wire L55 to wire L50 and to the movable contact 818 of switch 820. From switch 826 wire L53 is connected to the movable contact 838 of switch 840 having a stationary contact 842 connected to heater 816. It will be understood that switch 820 is normally closed, switch 832 being normally open and switch 840 normally closed. When relay 828 is energized, as hereinafter described, switch 820 is opened, switch 832 is closed and switch 840 is opened.

To operate the control unit 802, the rack 10 is positioned with the first receptacle to be filled in the liquid filling station, switch 580 is thrown to Ext. position, selector switch 812 is thrown to cycle/tube or cycle/drop operation, and start switch 826 is closed. Assuming that switch 812 is in cycle/tube position, i. e. contacts C2 and C3 thereof being engaged, the apparatus begins to operate under the control of the auxiliary control unit 592, as previously described. It will be noted that the pump motor 824 has one end connected through switch 826, engaged terminals 810 and 800, wires L46, L27 and L20, and through engaged terminals 606' and 606 to power terminal 572, as described. The other side of the pump motor 824 is connected through wire L51, closed switch 820, wires L50 and L49, contacts C3—C2 of switch 812, wire L48, engaged terminals 808, 796, wire L44, engaged terminals 612' and 612, normally closed contacts C1—C3 of switch 364, wires L18 and L17, and through switch 580B and the main control unit 562 to power terminal 564, as previously described. The pump motor 824 begins to operate to fill the container 50 with sufficient material for one receptacle. It will also be noted that one side of heater 816 is connected to the power supply through wire L49 and closed contacts C3—C2 of switch 812, as previously described, the other side thereof being connected thereto through closed switch 840, wire L53, switch 826, and terminal 810, as previously described. After motor 824 has operated sufficiently to supply a predetermined charge for one receptacle, the heater is sufficiently heated to cause the bi-metallic element 814 to flex and engage the contact 834. This completes a circuit through the time delay relay 828, which has one end connected to the power terminal 572 through wires L52, L53, switch 826 and terminal 810, as described, the other end now being in circuit with the power terminal 564 through wire L54, engaged contact 834 and bi-metal 814, wire L49, engaged contacts C3—C2 of switch 812, wire L48 and terminal 808, as described. Upon the energization of the relay, the armature thereof, as indicated at 844, is effective to open switch 820, thereby opening the pump motor circuit to stop the pump, and also opening switch 840 to break the heater circuit, and, in addition, closing switch 832 to provide a holding circuit to the power supply for the relay through said latter switch, wires L55, L50, engaged contacts C3—C2 of switch 812, wire L48 and terminal 808, whereby said relay remains energized after the cooling of bi-metal 814 whereupon the latter disengages from contact 834. When cam rise 360 of cam 354 engages operating part 366 of switch 364, the engaged contacts C1—C3 thereof are opened thereby breaking the circuit to the power terminal 564 from terminal 808 of pump unit 802 whereby relay 828 is de-energized, thereby closing switches 820 and 840, and opening switch 832 to condition unit 802 to repeat the cycle. As previously described, timer 600 in the auxiliary control unit begins to operate, upon the engagement of contacts C3—C2 of switch 364 when said rise 360 operates part 366, to count the drops flowing into the receptacle. Therefore, it will be apparent that the pump unit 802 permits one cycle of operation of pump motor 824 for each step of rack 10, whereby sufficient material is supplied to deliver a predetermined charge to each receptacle.

When it is desired to permit one cycle of operation of pump motor 824 for each drop of liquid that flows into the receptacle, rather than one cycle of operation for each receptacle as a unit, the selector switch 812 is thrown to cycle/drop position wherein the contacts C1 and C3 thereof, are engaged. Contact C1 is connected by wire L47 to terminal 806 which is engaged with terminal 794 of receptacle 792, said latter terminal being connected through wire L43 to contact 626 which is normally engaged by the movable contact 624 in the energized condition of relay 622, as previously described, thereby connecting said contact C1 to power terminal 564 through the main control unit 562, whereby the circuit of pump motor 824 to the power source is completed through said contact C1 instead of contact C2, as described, and said motor operates. It will also be understood that heater 816 is in circuit with the power terminals through said contact C1 and when the bi-metallic element 814 flexes, as described, relay 828 is energized, and switch 820 is opened to cut-off pump motor 824, switch 832 is closed to form a holding circuit for said relay and switch 840 is opened to cool heater 816. Upon the passage of a drop which interrupts the light between exciter lamp 436 and photo-cell 434, relay 622 is de-energized, as previously described, whereby contacts 626 and 624 are disengaged thereby breaking the holding circuit of relay 828 and de-energizing said relay. This results in the closing of switches 820 and 840, and the opening of switch 832 whereupon the pump motor 824 is again energized and the heater 816 is in circuit with the power input terminals and the cycle is repeated. Therefore, it is apparent that there will be an operating cycle of pump motor 824 for each drop of liquid passing between lamp 436 and photo-cell 434.

A pump operating unit 846 that may be used with the auxiliary control unit 592 in place of pump operating unit 802 is illustrated in Fig. 35. Said pump operating unit 846 is provided with a terminal plug 848 having the terminals 850, 852, 854 and 856 which engage with terminals 794, 796, 798 and 800, respectively, of terminal receptacle 792 of the auxiliary control unit. A selector switch 858 having the fixed contact C1 representing the cycle/tube position and the fixed contact C2 representing the cycle/drop position is provided, said contact C2 being connected by wire L63 to terminal 850, contact C1 being connected by wire L56 to terminal 852. The movable contact C3 of said switch is connected by wire L57 to the movable contact 860 of a normally closed switch 862, having a stationary contact 864 connected to the pump motor 866 which is connected by wire L58 to a wire L59 having one end connected to terminal 856. The other end of wire L59 is connected to one end of the primary coil of a filament transformer 868, the other end of said primary coil being connected by wire L60 to terminal 854. Said filament transformer provides the filament voltage for vacuum tube 870 which is preferably a 2050 thyratron. A relay 872 is connected between anode 874 of said tube and wire L59. The screen grid 876 is connected to the cathode 878 and to a screen dropping resistor 880 which is also connected to wire L59. Cathode 878 is connected by wire L61 to wire L57. The control grid 882 is connected to a grid resistor 884 which is connected to the parallel combination of a variable resistor 886 in shunt with a capacitor 888, said combination being connected by wire L62 which is connected to wire L60.

When switch 858 is in cycle/tube position, in which contacts C1—C3 thereof are engaged, it will be noted that anode 874 is connected to power terminal 572 through relay 872, wire L59, engaged terminals 856 and 800, and through the auxiliary control unit and the main control unit, as previously described. The cathode 878 is connected to power terminal 564 through wires L61 and L57, engaged contacts C1—C3 of switch 858, wire L56, engaged terminals 852 and 796, wire L44, engaged terminals 612' and 612, the normally closed contacts C1—C3 of switch 364, and through the main control unit, as previously described. Since the grid 882 is not biased at the moment that the circuit is completed by engaging the contacts C1—C3 of switch 858, tube 870 is rendered conductive thereby causing current flow from the cathode to the anode, through relay 872, through wire L59, through the engaged terminals 856 and 800, to power terminal 572, as described, and from power terminal 564, through the main control unit and the auxiliary control unit, as described, to engaged terminals 796 and 852, through wire L56, engaged contacts C1—C3 of switch 858, and wires L57 and L61 to the cathode. Said current flow through relay 872 energizes the latter to open switch 860, thereby breaking the circuit between pump motor 866 and power terminal 564. It will be noted that when switch 860 is closed, said pump motor is connected to power terminal 564 through wire 57 and engaged contacts C3—C1 of switch 858, as described for cathode 878. The other side of pump motor 866 is connected through wire L58, and engaged terminals 856 and 800 to power terminal 572, as previously described. Therefore, with tube 870 conductive, relay 872 is energized to prevent the operation of the pump motor 866. It will be understood that rack 10 turns, as previously described, under the control of the auxiliary control unit 592, and when cam rise 360 operates part 366 of switch 364, the movable contact C3 thereof is disengaged from contact C1 and engages contact C2 thereby breaking the described circuit between pump motor 866 and power terminal 564 and also breaking the same circuit between cathode 878 and said power terminal, thereby interrupting the described current path through tube 870 from said cathode to anode 874 whereby relay 872 is de-energized and switch 864 closes. However, said pump motor is still inoperative since its circuit to power terminal 564 is open at switch 364. It will be noted that there is another circuit between tube 870 and the power input terminals, the control grid 882 being connected to power terminal 564 through resistor 884, the combination of resistor 886 and capacitor 888, wires L62 and L60, engaged terminals 854 and 798, wires L45 and L23, engaged terminals 608' and 608 and through the main control unit 562, as previously described, to power terminal 564', the cathode being connected to power terminal 572 through screen resistor 880 to wire L59, and through the previously described circuit between anode 874 and power terminal 572. The grid 882 being connected to power terminal 564, at all times, and the cathode 878 being connected to power terminal 572, due to the disengagement of contact C3 of switch 364 from contact C1, as described, during those portions of the A. C. cycle, when the grid is positive relative to the cathode, there will be a grid current flow resulting in a negative bias voltage on the grid relative to the cathode, said bias voltage being developed across resistor 886. Following the movement of rack 10, as described, when cam rise 360 releases the operating part 366 of switch 364, the contacts C3—C1 thereof are engaged to complete the circuit between pump motor 866 and power terminal 564 and said motor begins to operate, it being noted that switch 860 is closed since relay 872 remains de-energized by the fact that the grid cut-off bias is retained as a negative charge across capacitor 888 even though the release of operating part 366 of switch 364 has completed the anode-cathode circuit of tube 870. The time-constant determining the time required for the bias charge across capacitor 888 to leak off through resistor 886 and thereby render the tube conductive to energize relay 872 and open switch 862 to cut-off pump motor 866, is determined by the setting of variable resistor 886 which constitutes a time delay control. It will be understood that resistor 886 can be adjusted to permit one or more operating cycles of pump motor 866, as desired, for each step of rack 10. Upon the discharge of capacitor 888 through resistor 886, the cut-off bias is removed and tube 870 is rendered conductive to repeat the described cycle of operation thereof.

In the operation just described, the operation of pump motor 866 was synchronized for each receptacle in the liquid-filling station. When it is desired to synchronize the operation thereof with the passage of each drop between the exciter lamp 436 and photo-cell 434, switch 858 is thrown to cycle/drop position in which contact C3 thereof engages contact C2 to complete the circuit between both pump motor 866 and cathode 878 from said engaged contacts through wire L63, engaged terminals 858 and 794, wire L43 to contact 626 of relay 622, which is normally engaged by contact 624 thereof, upon the normal energization of said relay, and from the latter contact through wires L22 and L23, through engaged terminals 608' and 608, and through the main control unit 562, as described, to power terminal 564.

The operation in cycle/drop position is substantially the same as in cycle/tube position, except that instead of breaking both the pump motor and the cathode-anode circuit upon the operation of part 366 by cam rise 360, these circuits are broken by the passage of a drop between exciter lamp 436 and photo-cell 434 which de-energizes relay 622, as described, to disengage contact 624 from contact 626. The bias voltage develops across capacitor 888, as described, and tube 870 remains non-conductive during which time pump motor 866 operates since relay 622 is energized, after the passage of the drop, as described. The adjustment of time delay control 886 again governs the number of cycles of operation of the pump motor by determining the time-constant for resistor 886 and capacitor 888. Therefore, it is apparent that for each drop that passes through the control unit 400 mounted between a funnel 32 and the receptacle in material charging position, the time delay control 886 can be set for a desired number of operating cycles of pump motor 866 to supply a predetermined amount of material to the apparatus.

It will be observed that the apparatus of the present invention is operable to supply an accurately measured quantity of liquid or other material to each of a predetermined large number of receptacles, without requiring the attention or presence of an attendant. Thus, for example, once the operation of the apparatus has been initiated, it may be left operating, overnight if necessary, until all the selected number of receptacles are supplied with liquid at which time the operation is automatically terminated, said termination of operation also terminating the operation of the pump motor, if used, since the automatic opening of switch 282 after all the receptacles have been filled also opens the circuit between the pump motor and the power input terminals.

While I have shown and described the presently preferred embodiment of my invention, it will be understood that various changes in the details of construction and in the form and arrangement of parts may be made without departing from the underlying principles of the invention within the scope of the appended claims.

Having thus described my invention, what I claim and desire to secure by Letters Patent, is:

1. Apparatus of the character described, comprising a material measuring control device having a material supply passage, means for supporting a plurality of receptacles in a plurality of laterally related circular rows, means responsive to the operation of said control device for moving said supporting means in relation to the outlet of said passage for presenting the receptacles in succession at a position to be supplied with material issuing from said outlet, means for automatically moving said control device laterally of said receptacle rows, whereby to position said device in material supplying relation to the receptacles of one of said rows following the supply of material to the receptacles of another of said rows, additional movable material supply passage means having an outlet positionable in material supplying relation to the receptacles of a row disposed laterally of the row being supplied from the outlet of said control device, and link means connecting said control device and said additional movable material supply passage for moving the latter laterally of said receptacle rows concomitantly with said lateral movement of said control device.

2. In apparatus having a movable control device provided with a material supply passage, means for supporting a plurality of receptacles in a plurality of laterally related rows, means for moving said supporting means in relation to the outlet of said passage for presenting the receptacles in succession at a position to be supplied with material issuing from said outlet, and means for automatically moving said control device laterally of said receptacle rows, whereby to position said device in material supplying relation to the receptacles of one of said rows following the supply of material to the receptacles of another of said rows, the combination with said control device of means including a material supply passage carried by said control device, said last mentioned means being adjustable for positioning the outlet of said latter passage in registry with the inlet of said first mentioned material supply passage, said last mentioned means comprising bracket means carried by said control device and adjustably spaced therefrom, said latter supply passage being mounted on said bracket means, and resilient means carried by said bracket means for releasably retaining said latter supply passage in position on said bracket means.

3. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, time-control means and material-count control means for determining the rest period of said container-supporting means between the intermittent movements thereof, means for selectively placing said motor under the control of either one of said control means whereby said motor is de-energized for a rest period determined by the selected one of said control means, and switching means in circuit with each of said control means, each of said switching means being operable at a predetermined position of said container-supporting means for energizing its associated control means to initiate said rest period.

4. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means provided with a motor in operative circuit relation with said first mentioned motor for determining the rest period of said container-supporting means between the intermittent movements thereof, and switching means operable by said moving means at a predetermined position of said container-supporting means for energizing said timing means motor and de-energizing said first mentioned motor.

5. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, material-count timing means in operative circuit relation with said motor for determining the rest period of said container-supporting means between the intermittent movements thereof, and switching means operable by said moving means at a predetermined position of said container-supporting means for energizing said timing means and de-energizing said motor, said switching means being positioned relative to said moving means to be operated thereby when each of said containers is in said receiving station.

6. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in circuit with said motor for determining the rest period of said container-supporting means between the intermittent movements thereof, and switching means operable by said moving means at a predetermined position of said container-supporting means for energizing said timing means and de-energizing said motor, said moving means including a part mounted for rotation and intermittently engaging said container-supporting means and cam means rotatable with said part, said cam means having a portion positioned relative to said part for operating said switching means when said part has rotated said container-supporting means to position a container in said receiving station.

7. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in operative circuit relation with said motor for determining the rest period of said container-supporting means between the intermittent movements thereof, means operable by said moving means at a predetermined position of said container-supporting means for energizing said timing means and de-energizing said motor, and control means responsive to the passage of a substance through said device for actuating said timing means to a predetermined setting thereof whereby said timing means is de-energized and said motor is energized.

8. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in operative circuit relation with said motor for determining the rest period of said container-supporting means between the intermittent movements thereof, and means operable by said moving means at a predetermined position of said container-supporting means for energizing said timing means and de-energizing said motor, said device being provided with control means for actuating said timing means to a predetermined setting thereof whereby said timing means is de-energized and said motor is energized, said control means comprising a lamp, a companion photo-electric cell, and a vertical passage across the path of light from said lamp to said cell, said vertical passage terminating in said material discharge outlet, and means including a relay operable under the control of said cell, said relay operating in response to the passage of a substance through said passage for actuating said timing means.

9. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in operative circuit relation with said motor for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and means actuated concomitantly with said timing means by said control means for recording the quantity of said substance discharged from said material-discharge outlet.

10. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in operative circuit relation with said motor for determining the rest period of said container-supporting means between the intermittent movements thereof, means operable by said moving means at a predetermined position of said container-supporting means for energizing said timing means and de-energizing said motor, said device being provided with control means for actuating said timing means to a predetermined setting thereof whereby said timing means is de-energized and said motor is energized, said control means including a vertical passage terminating in said material discharge outlet, and means including a relay operating in response to the passage of a substance through said passage for actuating said timing means, and means similarly actuated by said relay for recording the quantity of said substance passed through said passage.

11. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in operative circuit relation with said motor for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and multiplier means in operative circuit relation with said control means and said timing means, said multiplier means being actuated by said control means and, in turn, actuating said timing means at predetermined actuations of said multiplier means by said control means.

12. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, means for actuating said moving means, automatic-dispenser means for supplying material to said device, said dispensing means comprising a pump and a pump motor operative externally of said pump and independently of the material supplied thereto for actuating the pump, and means automatically operable in accordance with the quantity of material dispensed by said pump for energizing said actuating means for said intermittent moving means after a predetermined operation of said pump, whereby to supply each of the containers with a predetermined quantity of material.

13. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, means for actuating said moving means, timing means in circuit with said actuating means for determining the rest period of said container-supporting means between the intermittent movements thereof, means operable by said moving means at a predetermined position of said container-supporting means for energizing said timing means and de-energizing said actuating means, automatic dispenser means for supplying material to said device, said automatic dispenser means having a motor, and means operable by said motor for actuating said timing means to a predetermined setting thereof whereby said timing means is de-energized and said actuating means is energized.

14. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means in circuit with said motor for determining the rest period of said container-supporting means between the intermittent movements thereof, means operable by said moving means at a predetermined position of said container-supporting means for energizing said timing means and de-energizing said motor, automatic dispenser means for supplying material to said device, said automatic dispenser means having a motor, and switching means in circuit with said timing means, said switching means being operable by said second motor for energizing said timing means during each cycle of operation of said second motor to a predetermined setting of said timing means whereby said timing means is de-energized and said first motor is energized.

15. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, pump means for supplying material to said device, and means for operating said pump means between said movements of said container-supporting means, said latter means comprising a motor for operating said pump means, means for de-energizing said motor after the delivery of a predetermined supply of said material, and means for energizing said motor after each intermittent movement of said container-supporting means, said de-energizing means including relay means operable, upon the energization thereof, to open the circuit of said motor and thermostatic means for controlling the energization of said relay means.

16. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, switching means operable by said moving means at a predetermined position of said container-supporting means for energizing said timing means and de-energizing said motor, a second motor for operating an automatic dispenser for supplying material to said device, time-delay means for controlling the operation of said second motor for delivering a predetermined supply of said material to said device, said time-delay means including relay means operable, upon the energization thereof, to open the circuit of said second motor, thermostatic means for controlling the energization of said relay means and a holding circuit for said relay means operable upon the energization thereof by said thermostatic means to maintain said relay means in energized condition, said switching means being in circuit with said holding circuit and being operable at said predetermined position of said container-supporting means to de-energize said relay means.

17. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and means for operating an automatic dispenser for supplying material to said device upon said passage of a substance through said device.

18. Apparatus of the character described for use with a dispensing pump, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and means for operating said pump for supplying material to said device upon said passage of a substance through said device, said last mentioned means comprising a motor for operating said pump, means for de-energizing said latter motor after the delivery of a predetermined supply of said material and means for energizing said latter motor upon said passage of a substance through said device.

19. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and means for operating an automatic dispenser for supplying material to said device upon said passage of a substance through said device, said last mentioned means comprising a motor for operating said dispenser, means for de-energizing said latter motor after the delivery of a predetermined supply of said material and means for energizing said latter motor upon said passage of a substance through said device, said last mentioned de-energizing means including relay means operable, upon the energization thereof, to open the circuit of said latter motor and thermostatic means for controlling the energization of said relay means.

20. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, means operable by said moving means at a predetermined position of said container-supporting means for energizing said timing means and de-energizing said motor, control means responsive to the passage of a substance through said device for actuating said timing means to a predetermined setting thereof whereby said timing means is de-energized and said motor is energized, and means for operating an automatic dispenser for supplying material to said device upon said passage of a substance through said device, said last mentioned means comprising a motor for operating said dispenser, means for de-energizing said latter motor after the delivery of a predetermined supply of said material and means for energizing said latter motor upon said passage of a substance through said device, said last mentioned de-energizing means including relay means operable, upon the energization thereof, to open the circuit of said latter motor and thermostatic means for controlling the energization of said relay means, a holding circuit for said relay means operable upon the energization thereof by said thermostatic means to maintain said relay means in energized condition, and means for de-energizing said holding circuit upon said passage of a substance through said device.

21. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position and means operable in response to the movement of said container-supporting means for operating an automatic dispenser between said movement of said container-supporting means for supplying material to said device, said latter means comprising a motor for operating said dispenser, means for de-energizing said motor after the delivery of a predetermined supply of said material, and means for energizing said motor after each intermittent movement of said container-supporting means, said de-energizing means including electron-discharge means, relay means in circuit with said electron-discharge means and operable during normal conductivity of the latter to open the circuit of said motor, and means in circuit with said electron-discharge means for preventing said conductivity for a predetermined period.

22. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, and means operable in response to the movement of said container-supporting means for operating an automatic dispenser between said movement of said container-supporting means for supplying material to said device, said latter means comprising a motor for operating said dispenser, means for de-energizing said motor after the delivery of a predetermined supply of said material, and means for energizing said motor after each intermittent movement of said container-supporting means, said de-energizing means including electron-discharge means, relay means in circuit with said electron-discharge means and operable during normal conductivity of the latter to open the circuit of said motor, and means in circuit with said electron-discharge means for preventing said conductivity for a predetermined period, said preventing means being time-constant means for biasing said electron-discharge means.

23. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position and means operable in response to the movement of said container-supporting means for operating an automatic dispenser between said movement of said container-supporting means for supplying material to said device, said latter means comprising a motor for operating said dispenser, means for de-energizing said motor after the delivery of a predetermined supply of said material, and means for energizing said motor after each intermittent movement of said container-supporting means, said de-energizing means including an electron tube having at least an anode, a control grid and a cathode, relay means in the anode-cathode circuit of said tube and operable during current flow in said circuit to open the circuit of said motor, and time-constant means in the grid-cathode circuit of said tube for cutting off said current-flow in said anode-cathode circuit for a predetermined time interval.

24. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position and means operable in response to the movement of said container-supporting means for operating an automatic dispenser between said movement of said container-supporting means for supplying material to said device, said latter means comprising a motor for operating said dispenser, means for de-energizing said motor after the delivery of a predetermined supply of said material, and means for energizing said motor after each intermittent movement of said container-supporting means, said de-energizing means including an electron tube having at least an anode, a control grid and a cathode, relay means in the anode-cathode circuit of said tube and operable during current flow in said circuit to open the circuit of said motor, and time-constant means in the grid-cathode circuit of said tube for cutting off said current-flow in said anode-cathode circuit, and switching means in circuit with said anode-cathode circuit and operable by said moving means during each intermittent movement of said container-supporting means for opening said anode-cathode circuit, the current flow in said grid-cathode circuit developing a bias voltage across said time-constant means for cutting off said anode-cathode current flow for a predetermined period after said switching means closes said anode-cathode circuit.

25. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, switching means operable by said moving means at a predetermined position of said container-supporting means for energizing said timing means and de-energizing said motor, a second motor for operating an automatic dispenser for supplying material to said device, and time-delay means for controlling the operation of said second motor for delivering a predetermined supply of said material to said device, said time-delay means including an electron tube having at least an anode, a control grid and a cathode, relay means in the anode-cathode circuit of said tube and operable during current flow in said circuit to open the circuit of said second motor, and variable time-constant means in the grid-cathode circuit of said tube for cutting off said current-flow in said anode-cathode circuit, said switching means being in circuit with said anode-cathode circuit for opening the latter during each intermittent movement of said container-supporting means, the current flow in said grid-cathode circuit developing a bias voltage across said variable time-constant means for cutting off said anode-cathode current flow for a predetermined period after said switching means closes said anode-cathode circuit.

26. Apparatus of the character described, comprising a device provided with a material discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, switching means operable by said moving means at a predetermined position of said container-supporting means for energizing said timing means and de-energizing said motor, control means for actuating said timing means to a predetermined setting thereof whereby said timing means is de-energized and said motor is energized, said control means including a passage terminating in said material discharge outlet and means including a relay operating in response to the passage of a substance through said passage for actuating said timing means, a second motor for operating an automatic dispenser for supplying material to said device, and time-delay means for controlling the operation of said second motor for delivering a predetermined supply of said material to said device, said time-delay means including electron-discharge means, relay means in circuit with said electron-discharge means and operable during normal conductivity of the latter to open the circuit of said second motor, said electron-discharge means being in circuit with said first mentioned relay and being rendered non-conductive by the passage of said substance to de-energize said latter relay means.

27. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, timing means for determining the rest period of said container-supporting means between the intermittent movements thereof, switching means operable by said moving means at a predetermined position of said container-supporting means for energizing said timing means and de-energizing said motor, control means for actuating said timing means to a predetermined setting thereof whereby said timing means is de-energized and said motor is energized, said control means including a passage terminating in said material discharge outlet and means including a relay operating in response to the passage of a substance through said passage for actuating said timing means, a second motor for operating an automatic dispenser for supplying material to said device, time delay means for controlling the operation of said second motor for delivering a predetermined supply of said material to said device, said time-delay means including an electron tube having at least an anode, a control grid and a cathode, relay means in the anode-cathode circuit of said tube and operable during current-flow in said circuit to open the circuit of said second motor, and variable time-constant means in the grid-cathode circuit of said tube for cutting off said current-flow in said anode-cathode circuit, said first mentioned relay being in circuit with said anode-cathode circuit and operable to open said circuit upon the passage of said substance, the current flow in said grid-cathode circuit developing a bias voltage across said variable time-constant means for cutting off said anode-cathode current flow for a predetermined period after said first mentioned relay has returned to its original condition to complete said anode-cathode circuit.

28. In an automatic fraction collector having a device provided with a material-discharge outlet, container-supporting means mounted for movement in relation to said outlet and constructed and arranged to carry a plurality of containers in spaced relation to position the containers to receive material discharged from said outlet, and means for moving said container-supporting means intermittently to present said containers in succession to said receiving position; means for operating an automatic dispenser between said movements of said container-supporting means for supplying material to said device comprising a motor for operating said dispenser, means for de-energizing said motor after the delivery of a predetermined supply of said material, and means for energizing said motor after each intermittent movement of said container-supporting means, said de-energizing means including relay means operable, upon the energization thereof, to open the circuit of said motor and thermostatic means for controlling the energization of said relay means.

29. In an automatic fraction collector having a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, timing means for determining the rest period of said container-supporting means between the intermittent movements thereof, and control means responsive to the passage of a substance through said device for actuating said timing means to a predetermined setting thereof whereby said timing means is de-energized and said supporting means is moved; means for operating an automatic dispenser for supplying material to said device upon said passage of a substance through said device comprising a motor for operating said dispenser, means for de-energizing said motor after the delivery of a predetermined supply of said material and means for energizing said motor upon said passage of a substance through said device.

30. In an automatic fraction collector having a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, timing means for determining the rest period of said container-supporting means between the intermittent movements thereof, and control means responsive to the passage of a substance through said device for actuating said timing means to a predetermined setting thereof whereby said timing means is deenergized and said supporting means is moved; means for operating an automatic dispenser for supplying material to said device upon said passage of a substance through said device comprising a motor for operating said dispenser, means for de-energizing said motor after the delivery of a predetermined supply of said material and means for energizing said motor upon said passage of a substance through said device, said last mentioned de-energizing means including relay means operable, upon the energization thereof, to open the circuit of said motor and thermostatic means for controlling the energization of said relay means, a holding circuit for said relay means operable upon the energization thereof by said thermostatic means to maintain said relay means in energized condition, and means for de-energizing said holding circuit upon said passage of a substance through said device.

31. In an automatic fraction collector having a device provided with a material-discharge outlet, container-supporting means mounted for movement in relation to said outlet and constructed and arranged to carry a plurality of containers in spaced relation to position the containers to receive material discharged from said outlet, and means for moving said container-supporting means intermittently to present said containers in succession to said receiving position; means for operating an automatic dispenser between said movements of said container-supporting means for supplying material to said device comprising a motor for operating said dispenser, means for de-energizing said motor after the delivery of a predetermined supply of said material, and means for energizing said motor after each intermittent movement of said container-supporting means, said de-energizing means including electron-discharge means, relay means in circuit with said electron-discharge means and operable during normal conductivity of the latter to open the circuit of said motor, and means in circuit with said electron-discharge means for preventing said conductivity for a predetermined period.

32. In an automatic fraction collector having a device provided with a material-discharge outlet, container-supporting means mounted for movement in relation to said outlet and constructed and arranged to carry a plurality of containers in spaced relation to position the containers to receive material discharged from said outlet, and means for moving said container-supporting means intermittently to present said containers in succession to said receiving position; means for operating an automatic dispenser between said movements of said container-supporting means for supplying material to said device comprising a motor for operating said dispenser, means for de-energizing said motor after the delivery of a predetermined supply of said material, and means for energizing said motor after each intermittent movement of said container-supporting means, said de-energizing means including electron-discharge means, relay means in circuit with said electron-discharge means and operable during normal conductivity of the latter to open the circuit of said motor, and means in circuit with said electron-discharge means for preventing said conductivity for a predetermined period, said preventing means being time-constant means for biasing said electron-discharge means.

33. In an automatic fraction collector having a device provided with a material-discharge outlet, container-supporting means mounted for movement in relation to said outlet and constructed and arranged to carry a plurality of containers in spaced relation to position the containers to receive material discharged from said outlet, and means for moving said container-supporting means intermittently to present said containers in succession to said receiving position; means for operating an automatic dispenser between said movements of said container-supporting means for supplying material to said device comprising a motor for operating said dispenser, means for de-energizing said motor after the delivery of a predetermined supply of said material, and means for energizing said motor after each intermittent movement of said container-supporting means, said de-energizing means including an electron tube having at least an anode, a control grid and a cathode, relay means in the anode-cathode circuit of said tube and operable during current flow in said circuit to open the circuit of said motor, and time-constant means in the grid-cathode circuit of said tube for cutting off said current-flow in said anode-cathode circuit for a predetermined time interval.

34. In an automatic fraction collector having a device provided with a material-discharge outlet, container-supporting means mounted for movement in relation to said outlet and constructed and arranged to carry a plurality of containers in spaced relation to position the containers to receive material discharged from said outlet, and means for moving said container-supporting means intermittently to present said containers in succession to said receiving position; means for operating an automatic dispenser between said movements of said container-supporting means for supplying material to said device comprising a motor for operating said dispenser, means for de-energizing said motor after the delivery of a predetermined supply of said material, and means for energizing said motor after each intermittent movement of said container-supporting means, said de-energizing means including an electron tube having at least an anode, a control grid and a cathode, relay means in the anode-cathode circuit of said tube and operable during current flow in said circuit to open the circuit of said motor, time-constant means in the grid-cathode circuit of said tube for cutting off said current-flow in said anode-cathode circuit, and switching means in circuit with said anode-cathode circuit and operable by said moving means during each intermittent movement of said container-supporting means for opening said anode-cathode circuit, the current flow in said grid-cathode circuit developing a bias voltage across said time-constant means for cutting off said anode-cathode current flow for a predetermined period after said switching means closes said anode-cathode circuit.

35. In an automatic fraction collector having a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, timing means for determining the rest period of said container-supporting means between the intermittent movements thereof, and control means responsive to the passage of a substance through said device for actuating said timing means to a predetermined setting thereof whereby said timing means is de-energized and said supporting means is moved; means for operating an automatic dispenser for supplying material to said device upon said passage of a substance through said device comprising a motor for operating said dispenser, means for de-energizing said motor after the delivery of a predetermined supply of said material and means for energizing said motor upon said passage of a substance through said device, said de-energizing means including electron-discharge means, relay means in circuit with said electron-discharge means and operable during normal conductivity of the latter to open the circuit of said motor, said electron-discharge means being in circuit with said control means and being rendered non-conductive by said passage of the substance to de-energize said relay means.

36. In an automatic fraction collector having a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, timing means for determining the rest period of said container-supporting means between the intermittent movements thereof and control means responsive to the passage of a substance through said device for actuating said timing means to a predetermined setting thereof whereby said timing means is de-energized and said supporting means is moved; means for operating an automatic dispenser for supplying material to said device upon said passage of a substance through said device comprising a motor for operating said dispenser, means for de-energizing said motor after the delivery of a predetermined supply of said material and means for energizing said motor upon said passage of a substance through said device, said de-energizing means including an electron tube having at least an anode, a control grid and a cathode, relay means in the anode-cathode circuit of said tube and operable during current-flow in said circuit to open the circuit of said motor, and variable time-constant means in the grid-cathode circuit of said tube for cutting off said current-flow in said anode-cathode circuit, said control means being in circuit with said anode-cathode circuit and operable to open said circuit upon said passage of said substance, the current flow in said grid-cathode circuit developing a bias voltage across said variable time-constant means for cutting off said anode-cathode current flow for a predetermined period after said passage of said substance.

37. Apparatus of the character described, comprising a movable device having a material supply passage, means for supporting a plurality of receptacles in a plurality of laterally related rows, means for intermittently moving said supporting means in relation to the outlet of said passage for presenting the receptacles in succession at a position to be supplied with material issuing from said outlet, means releasably engageable with said supporting means for releasably preventing free turning movement thereof between said intermittent movements thereof, releasable means for holding said device in stationary position while the receptacles of each row are presented to said outlet, said releasable means being automatically operable to move said device laterally of said receptacle rows so that the receptacles of one row are presented to said outlet following the presentation of the receptacles of another of said rows to said outlet, and manually operable means operable in one position thereof to release only said releasable engaging means so that said supporting means can be moved manually while said device is retained in fixed position, said manually operable means being operable in another position thereof for additionally releasing said releasable holding means so that said device can be moved manually to a predetermined position relative to said receptacle rows.

38. Apparatus of the character described, comprising a movable device having a material supply passage, means for supporting a plurality of receptacles in a plurality of laterally related rows, means for intermittently moving said supporting means in relation to the outlet of said passage for presenting the receptacles in succession at a position to be supplied with material issuing from said outlet, means releasably engageable with said supporting means for releasably preventing free turning movement thereof between said intermittent movements thereof, releasable means for holding said device in stationary position while the receptacles of each row are presented to said outlet, said releasable means being automatically operable to move said device laterally of said receptacle rows so that the receptacles of one row are presented to said outlet following the presentation of the receptacles of another of said rows to said outlet, and manually operable means operable in one position thereof to release only said releasably engaging means so that said supporting means can be moved manually while said device is retained in fixed position, said manually operable means being operable in another position thereof for additionally releasing said releasable holding means so that said device can be moved manually to a predetermined position relative to said receptacle rows, said manually operable means comprising a link assembly having a manually operable link and links connected to said releasable engaging means and said releasable holding means, respectively, said link assembly being provided with lost motion mechanism whereby operation of said manually operable link from a retracted position thereof to a predetermined position thereof operates only the link connected to said releasable engaging means, and operation of said manually operable link beyond said predetermined position operates the link connected to said releasable holding means.

39. Apparatus of the character described, comprising a movable device having a material supply passage, means for supporting a plurality of receptacles in a plurality of laterally related rows, means for intermittently moving said supporting means in relation to the outlet of said passage for presenting the receptacles in succession at a position to be supplied with material issuing from said outlet, means releasably engageable with said supporting means for releasably preventing free turning movement thereof between said intermittent movements thereof, releasable means for holding said device in stationary position while the receptacles of each row are presented to said outlet, said releasable means being automatically operable to move said device laterally of said receptacle rows so that the receptacles of one row are presented to said outlet following the presentation of the receptacles of another of said rows to said outlet, and manually operable means operable in one position thereof to release only said releasably engaging means so that said supporting means can be moved manually while said device is retained in fixed position, said manually operable means being operable in another position thereof for additionally releasing said releasable holding means so that said device can be moved manually to a predetermined position relative to said receptacle rows, said manually operable means comprising a link assembly having a manually operable link and links connected to said releasable engaging means and said releasable holding means, respectively, said link assembly being provided with lost motion mechanism whereby operation of said manually operable link from a retracted position thereof to a predetermined position thereof operates only the link connected to said releasable engaging means, and operation of said manually operable link beyond said predetermined position operates the link connected to said releasable holding means, and spring means connected to said link assembly for returning the links thereof to their original position upon the movement of said manually operable link to its retracted position.

40. Apparatus of the character described, comprising a movable device having a material supply passage, means for supporting a plurality of receptacles in a plurality of laterally related rows, means for intermittently moving said supporting means in relation to the outlet of said passage for presenting the receptacles in succession at a position to be supplied with material issuing from said outlet, said movable device being mounted for movement in relation to said support means laterally of said receptacle rows for disposing said outlet of said passage of said device over each of said rows of receptacles, respectively, for registering successively with the receptacles in each of said rows during said intermittent movement of said supporting means, a main control unit having time-control means for determining the rest period of said supporting means between said intermittent movements thereof, an auxiliary control unit operatively connected to said main control unit, said auxiliary control unit being provided with material-discharge control means for determining said rest period, means for selectively operating said intermittent moving means under the control of one of said control means, an automatic dispenser for supplying material to said device, a control unit including a motor for operating said automatic dispenser to supply material to said device, said dispenser control unit being releasably engageable with said auxiliary control unit, and means for operating said motor under the control of said material-discharge control means.

41. An apparatus comprising a device having a material supply passage, means for supporting a plurality of receptacles, means for intermittently moving said supporting means in relation to the outlet of said passage for presenting the receptacles in succession at a position to be supplied with material issuing from said outlet, means for determining the rest period of said intermittent moving means between the intermittent movements of said supporting means and an auxiliary control unit provided with additional means for determining the rest periods of said intermittent moving means between the intermittent movements of said supporting means, and means for selectively placing said intermittent moving means under the control of said additional rest period determining means.

42. An apparatus comprising a device having a material supply passage, means for supporting a plurality of receptacles, means for intermittently moving said supporting means in relation to the outlet of said passage for presenting the receptacles in succession at a position to be supplied with material issuing from said outlet, means for determining the rest period of said intermittent moving means between the intermittent movements of said supporting means and an auxiliary control unit provided with additional means for determining the rest periods of said intermittent moving means between the intermittent movements of said supporting means, and said additional means being operative in response to the passage of material to said receptacles and means for selectively placing said intermittent moving means under the control of said additional means.

43. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving position, a motor for actuating said moving means, a main control unit having time-control means, an auxiliary control unit having material-count control means, said units being releasably connectable, each of said control means being operable to determine the rest period of said container-supporting means between the intermittent movements thereof, means for selectively placing said motor under the control of either one of said control means whereby said motor is de-energized for a rest period determined by the selected one of said control means, and means for de-energizing said motor and for energizing the selected one of said control means each time a container is in said receiving station.

44. Apparatus of the character described, comprising a device provided with a material-discharge outlet, container-supporting means mounted for movement in relation to said outlet and constructed and arranged to carry a plurality of containers in spaced relation to position the containers to receive material discharged from said outlet, means for moving said container-supporting means intermittently to present said containers in succession to said receiving station, a motor for actuating said moving means, time-control means and auxiliary material-count control means for determining the rest period of said container-supporting means between the intermittent movements thereof, said control means being releasably connectable, means for selectively placing said motor under the control of either one of said control means whereby said motor is de-energized for a rest period determined by the selected one of said control means, and means for de-energizing said motor and for energizing the selected one of said control means each time a container is in said receiving station, comprising means operable by said moving means at a predetermined position of said container-supporting means for interrupting the circuit of said motor and for operating one of said control means, and means movable in relation to said container-supporting means at the end of each intermittent movement thereof for operating the other of said control means.

45. Apparatus of the character described, comprising a movable material supply passage means, means for supporting a plurality of receptacles in a plurality of laterally related rows, means for moving said supporting means in relation to the outlet of said passage means for presenting the receptacles in succession at a position to be supplied with material issuing from said outlet, means responsive to the completion of the filling of one row of receptacles to move said supply passage means laterally from said row to another row of empty receptacles, whereby to position said supply passage means in material supplying relation to the receptacles of said other row following the supply of materials to the receptacles of said one row, an additional movable material supply passage means having an outlet positionable in material supplying relation to the receptacles of a row disposed laterally of the row being supplied by said first mentioned material supply passage means, and means interengaging said two material supply passage means for moving said additional passage means laterally of said receptacle rows concomitantly with said lateral movement of said first mentioned material supply passage means.

46. Apparatus of the character described, comprising a movable device having a material-supply passage, rotary means for supporting a plurality of receptacles in a plurality of laterally related rows, means for moving said supporting means intermittently in relation to the outlet of said passage for presenting the receptacles in succession at a position to be supplied with material issuing from said outlet, said movable device being mounted for movement in relation to said rotary support means laterally of said receptacle rows for disposing said outlet of said passage of said device over each of said rows of receptacles, respectively, for registering successively with the receptacles in each of said rows during said intermittent movement of said rotary supporting means, dispensing pump means for supplying material to said device, means for operating said pump means between the movements of said supporting means, and means operable automatically in response to a predetermined movement of said supporting means for moving said movable device laterally of said receptacle rows to position the outlet of said passage into registry with the receptacles of one of said rows following the supply of material to the receptacles of another of said rows, whereby the same outlet passage is operable to supply the material to the receptacles in a plurality of said rows.

47. Apparatus of the character described, comprising a movable device having a material supply passage, means for supporting a plurality of receptacles in a plurality of laterally related rows, means for moving said supporting means intermittently in relation to the outlet of said passage for presenting the receptacles in succession at a position to be supplied with material issuing from said outlet, said movable device being mounted for movement in relation to said support means laterally of said receptacle rows for disposing said outlet of said passage of said device over each of said rows of receptacles, respectively, for registering successively with the receptacles in each of said rows during said intermittent movement of said supporting means, dispensing pump means for supplying material to said device, means for operating said pump means between the movements of said supporting means, and means operable automatically in response to a predetermined movement of said supporting means for moving said movable device laterally of said receptacle rows, whereby to position said device in material supplying relation to the receptacles of one of said rows following the supply of material to the receptacles of another of said rows, said pump operating means comprising a motor for operating said pump, means for de-energizing said motor after the delivery of a predetermined supply of said material, and means for energizing said motor after each intermittent movement of said supporting means.

48. Apparatus of the character described, comprising a movable device having a material supply passage, means for supporting a plurality of receptacles in a plurality of laterally related rows, means for intermittently moving said supporting means in relation to the outlet of said passage for presenting the receptacles in succession at a position to be supplied with material issuing from said outlet, means for automatically moving said device laterally of said rows for positioning said device in material supplying relation to the receptacles of one of said rows following the supply of material to the receptacles of another of said rows, a main control unit having a first control means for determining the rest period of said supporting means between said intermittent movements thereof, an auxiliary control unit operatively connected to said main control unit, said auxiliary control unit being provided with a second control means for determining said rest period, and means for selectively operating said intermittent moving means under the control of one of said control means.

49. Apparatus of the character described, comprising a device provided with a material-discharge outlet, container-supporting means mounted for movement in relation to said outlet and constructed and arranged to carry a plurality of containers in spaced relation to position the containers at a station to receive material discharged from said outlet, means for moving said container-supporting means intermittently to present said containers in succession to said receiving station, a main control unit having time-control means for determining the rest period of said supporting means between said intermittent movements thereof, an auxiliary control unit operatively connected to said main control unit, said auxiliary control unit being provided with material-discharge control means for determining said rest period and means for selectively operating said intermittent moving means under the control of one of said control means.

50. Apparatus of the character described, comprising a device provided with a material-discharge outlet, container-supporting means mounted for movement in relation to said outlet and constructed and arranged to carry a plurality of containers in spaced relation to position the containers at a station to receive material dicharged from said outlet, means for moving said container-supporting means intermittently to present said containers in succession to said receiving station, a main control unit having a first control means for determining the rest period of said supporting means between said intermittent movements thereof, an auxiliary control unit operatively connected to said main control unit, said auxiliary control unit being provided with a second control means for determining said rest period, and means for selectively operating said intermittent moving means under the control of one of said control means.

51. Apparatus of the character described, comprising a device provided with a material-discharge outlet, container-supporting means mounted for movement in relation to said outlet and constructed and arranged to carry a plurality of containers in spaced relation to position the containers at a station to receive material discharged from said outlet, means for moving said container-supporting means intermittently to present said containers in succession to said receiving station, a main control unit having a time-control means for determining the rest period of said supporting means between said intermittent movements thereof, an auxiliary control unit operatively connected to said main control unit, said auxiliary control unit being provided with material-discharge control means for determining said rest period, means for selectively operating said intermittent moving means under the control for one of said control means, an automatic dispenser for supplying material to said device, a control unit including a motor for operating said automatic dispenser to supply material to said device, said dispenser control unit being operatively connected to said auxiliary control unit, and means for operating said motor under the control of said material-discharge control means.

52. Apparatus of the character described, comprising a device provided with a material-discharge outlet, container-supporting means mounted for movement in relation to said outlet and constructed and arranged to carry a plurality of containers in spaced relation to position the containers at a station to receive material discharged from said outlet, means for moving said container-supporting means intermittently to present said containers in succession to said receiving station, a main control unit having time-control means for determining the rest period of said supporting means between said intermittent movements thereof, an automatic-dispenser for supplying material to said device, an auxiliary control unit operatively connected to said main control unit and including a motor and time-control means therefor for operating said automatic dispenser to supply material to said device, and means for selectively operating said intermittent moving means under the control of one of said time-control means.

53. Apparatus of the character described, comprising a movable control device having a material supply passage, rotary support means for supporting a plurality of receptacles in a plurality of separate laterally related rows, means responsive to the operation of said control device for turning said support means step-by-step in relation to the outlet of said passage for presenting the receptacles in succession at a position to be supplied with material issuing from said outlet, said control device being mounted for movement in relation to said rotary support means laterally of said receptacle rows for disposing said outlet of said passage of said device over each of said rows of receptacles, respectively, for registering successively with the receptacles in each of said rows during said step-by-step movement of said rotary supporting means, releasably restraining mechanism operable in response to a predetermined movement of said support means for moving said movable device laterally of said receptacle rows to position the outlet of said passage into registry with the receptacles in one of said rows following the supply of material from said outlet to another of said rows, whereby the same outlet passage is operable to supply the material to the receptacles in a plurality of said rows, and means operated by said supporting means for controlling the operation of said mechanism.

References Cited in the file of this patent

UNITED STATES PATENTS

| | | |
|---|---|---|
| 1,097,708 | Elson | May 26, 1914 |
| 1,101,568 | Roberts | June 30, 1914 |
| 1,146,402 | Chambers | July 13, 1915 |
| 1,482,467 | Harrington | Feb. 5, 1924 |
| 2,333,791 | Hutchison, Jr. | Nov. 9, 1943 |
| 2,381,505 | Lindholm | Aug. 7, 1945 |
| 2,383,377 | Evans et al. | Aug. 21, 1945 |
| 2,433,560 | Hurley, Jr. | Dec. 30, 1947 |
| 2,493,382 | Bell | Jan. 3, 1950 |
| 2,523,517 | Potter | Sept. 26, 1950 |
| 2,604,248 | Gorham | July 22, 1952 |
| 2,604,249 | Gorham | July 22, 1952 |

FOREIGN PATENTS

| | | |
|---|---|---|
| 31,695 | Denmark | May 14, 1923 |
| 33,565 | Denmark | Aug. 18, 1924 |